US011836755B2

(12) United States Patent
Johnson et al.

(10) Patent No.: US 11,836,755 B2
(45) Date of Patent: Dec. 5, 2023

(54) UTILIZING MACHINE LEARNING AND A SMART TRANSACTION CARD TO AUTOMATICALLY IDENTIFY OPTIMAL PRICES AND REBATES FOR ITEMS DURING IN-PERSON SHOPPING

(71) Applicant: Capital One Services, LLC, McLean, VA (US)

(72) Inventors: Molly Johnson, Alexandria, VA (US); Adam Vukich, Alexandria, VA (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 43 days.

(21) Appl. No.: 16/881,649

(22) Filed: May 22, 2020

(65) Prior Publication Data

US 2021/0365976 A1    Nov. 25, 2021

(51) Int. Cl.
*G06Q 30/0207* (2023.01)
*G06Q 30/0283* (2023.01)
*G06Q 20/34* (2012.01)
*G06N 20/00* (2019.01)
*G06Q 30/0601* (2023.01)

(52) U.S. Cl.
CPC ......... *G06Q 30/0222* (2013.01); *G06N 20/00* (2019.01); *G06Q 20/341* (2013.01); *G06Q 30/0283* (2013.01); *G06Q 30/0611* (2013.01)

(58) Field of Classification Search
CPC ............ G06Q 30/0222; G06Q 20/341; G06Q 30/0283; G06Q 30/0611; G06N 20/00
See application file for complete search history.

(56) References Cited

U.S. PATENT DOCUMENTS

| | | | | |
|---|---|---|---|---|
| 10,296,907 B1* | 5/2019 | Nolte | ........................ | G06F 1/00 |
| 10,855,835 B1* | 12/2020 | Fontana | ............ | H04M 3/42136 |
| 2010/0161434 A1* | 6/2010 | Herwig | ................ | G06Q 20/208 |
| | | | | 235/375 |
| 2010/0161720 A1* | 6/2010 | Colligan | ................. | H04W 4/02 |
| | | | | 711/E12.002 |
| 2010/0250333 A1* | 9/2010 | Agrawal | ................ | G06Q 30/06 |
| | | | | 705/14.34 |
| 2012/0296565 A1* | 11/2012 | Liu | ..................... | G01C 21/3697 |
| | | | | 701/439 |
| 2013/0311335 A1* | 11/2013 | Howard | ............. | G06Q 30/0641 |
| | | | | 705/26.64 |

(Continued)

*Primary Examiner* — Ilana L Spar
*Assistant Examiner* — Allan J Woodworth, II
(74) *Attorney, Agent, or Firm* — Harrity & Harrity, LLP

(57) ABSTRACT

A device may receive, from a client device of a customer, item data identifying a price of an item and customer data identifying the customer, where the item data may be received by a transaction card from a price tag of the item. The device may receive price data identifying prices associated with multiple items and other data identifying locations, availabilities, and terms of the multiple items, and may process the item data, the price data, and the other data, with a machine learning model, to identify an optimal price for the item. The device may provide, to the client device, data identifying the optimal price and data identifying a merchant associated with the optimal price, and may receive transaction data identifying the item, the optimal price, and the merchant when the customer purchases the item. The device may perform actions based on the transaction data.

20 Claims, 19 Drawing Sheets

(56) References Cited

U.S. PATENT DOCUMENTS

| | | | |
|---|---|---|---|
| 2014/0278804 A1* | 9/2014 | Lanxner | G06Q 30/0206 |
| | | | 705/7.35 |
| 2017/0262889 A1* | 9/2017 | Gurunathan | G06Q 30/0261 |
| 2017/0318140 A1* | 11/2017 | Sinha | H04M 1/0249 |
| 2018/0181956 A1* | 6/2018 | Zarakas | G06Q 20/3829 |
| 2019/0272557 A1* | 9/2019 | Smith | G06Q 10/087 |
| 2020/0043027 A1* | 2/2020 | Bhasin | G06Q 30/0629 |

* cited by examiner

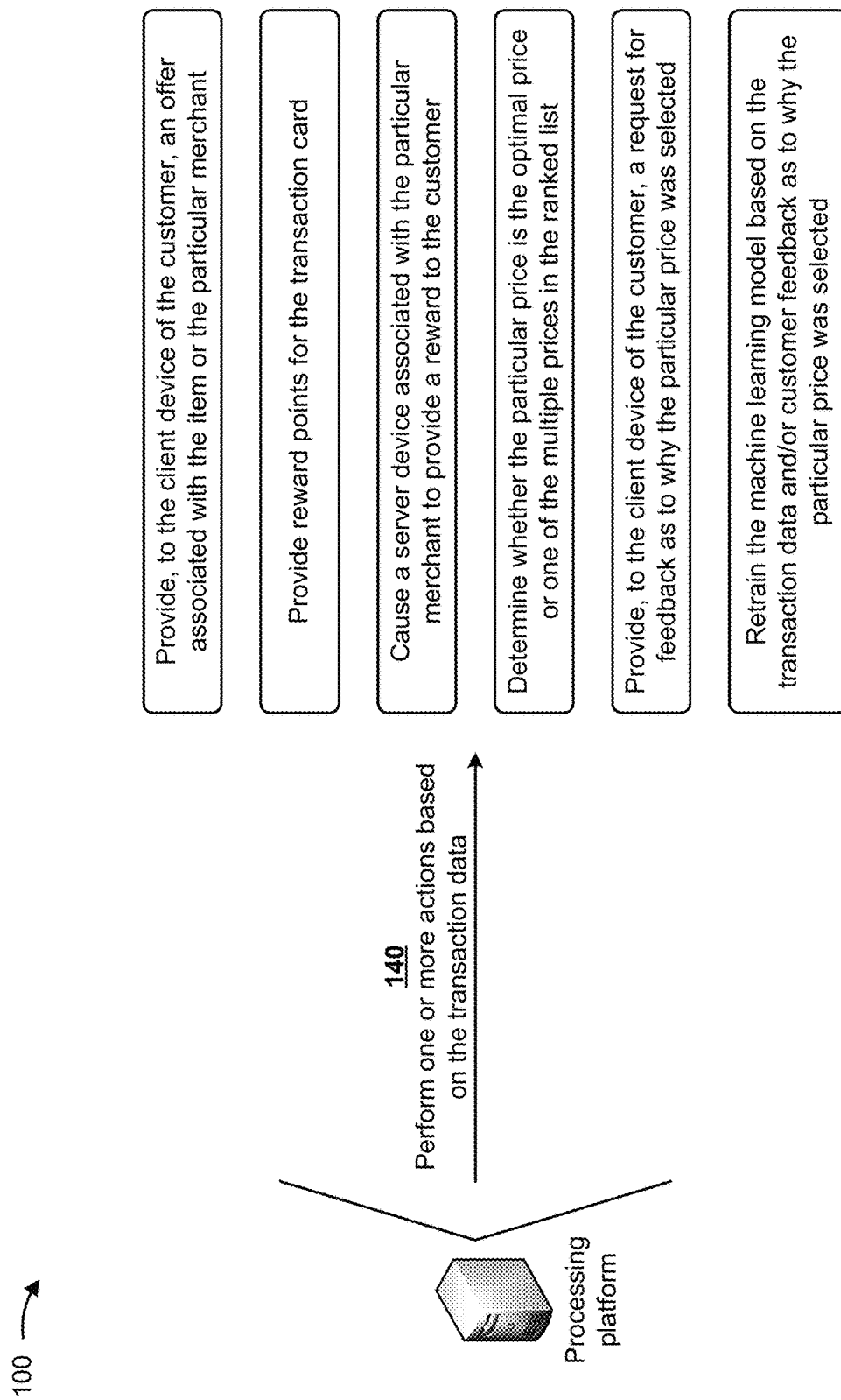

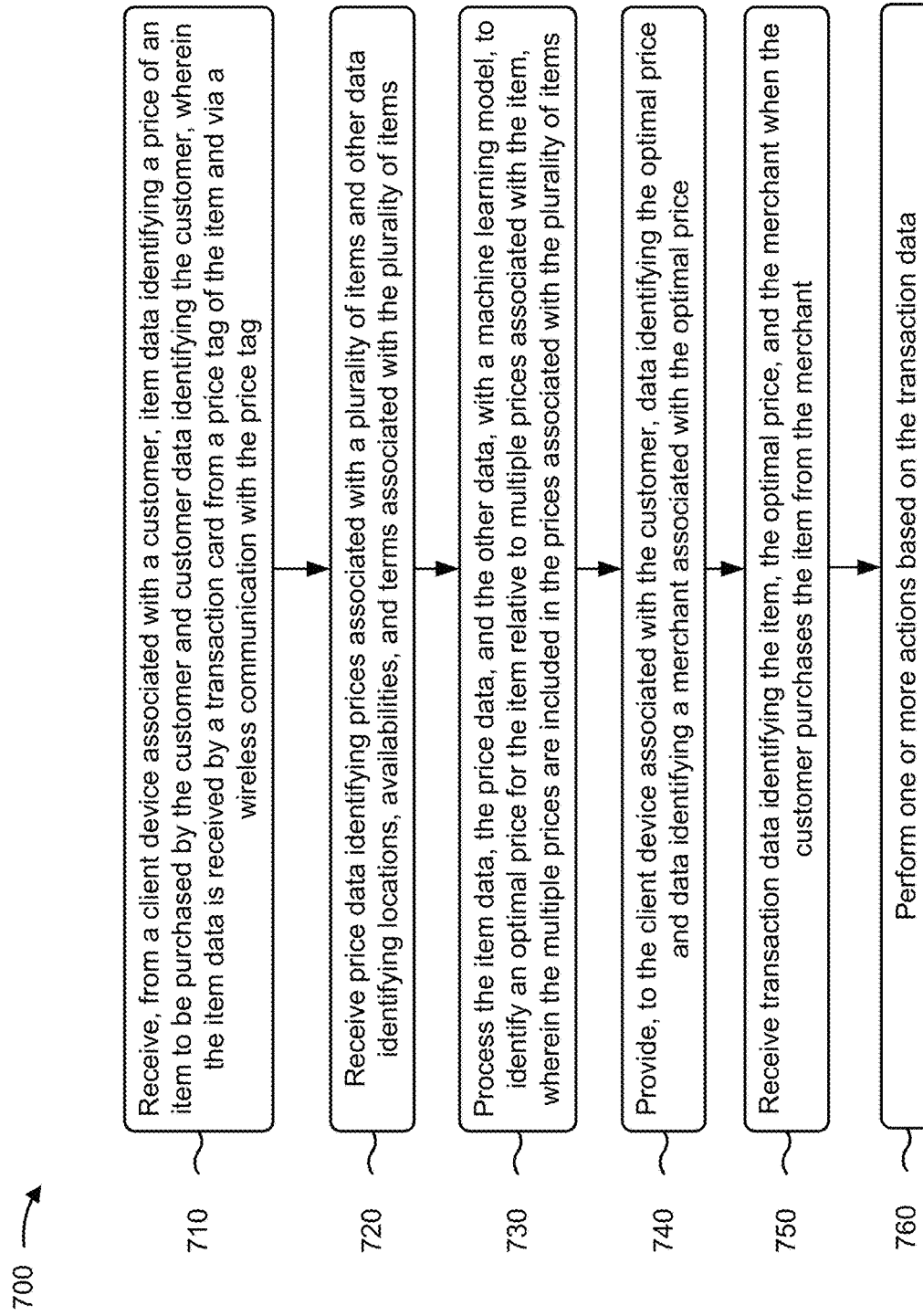

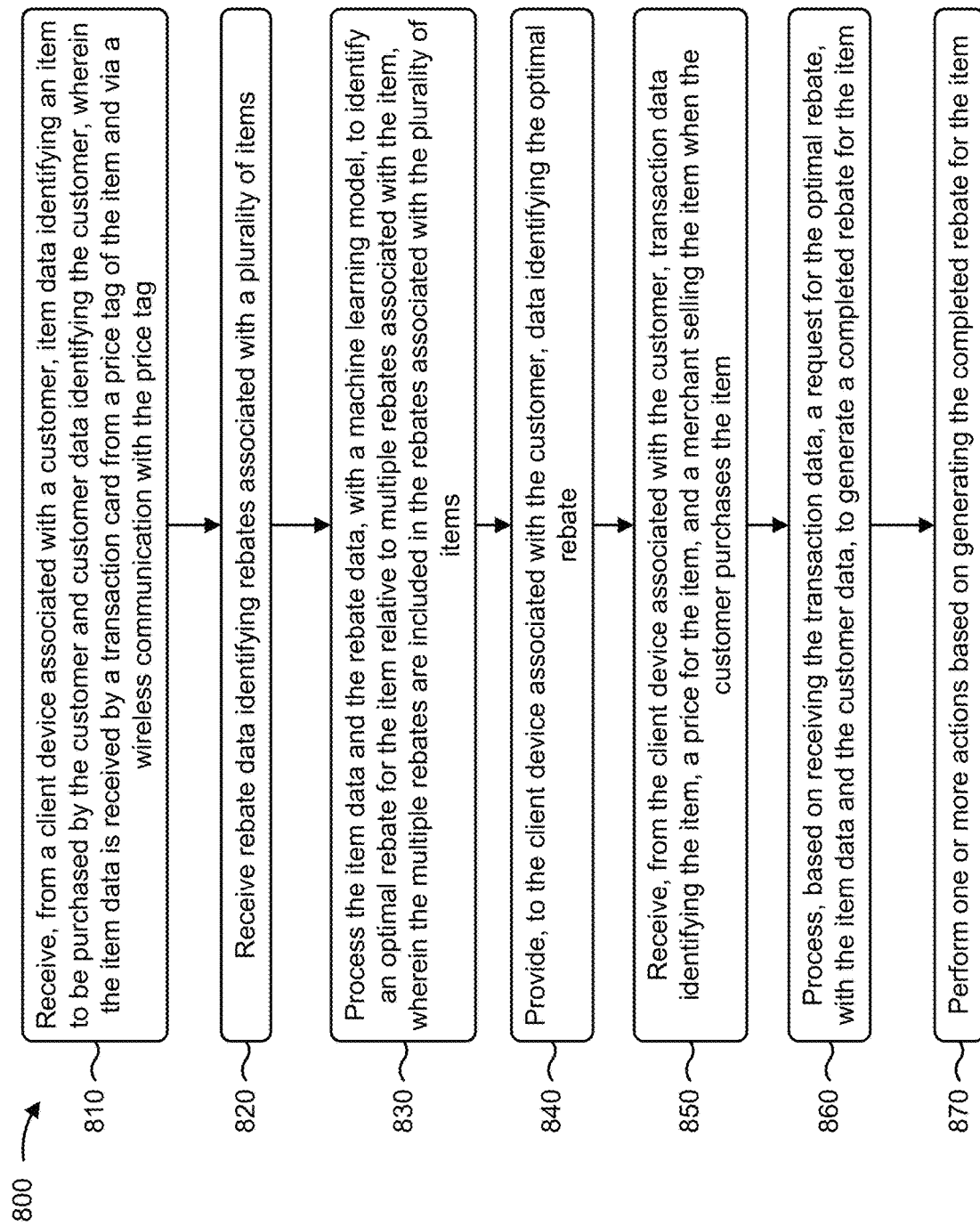

UTILIZING MACHINE LEARNING AND A SMART TRANSACTION CARD TO AUTOMATICALLY IDENTIFY OPTIMAL PRICES AND REBATES FOR ITEMS DURING IN-PERSON SHOPPING

BACKGROUND

An online comparison shopping website may enable customers to filter and compare products and/or service based on prices, features, reviews, and other criteria. It may be more difficult for customers to comparison shop during in-person shopping at merchant stores. A rebate is an amount paid by way of reduction, return, or refund on what has already been purchased by a customer. A rebate may be used primarily as an incentive or to supplement product and/or service sales.

SUMMARY

According to some implementations, a method may include receiving, from a client device associated with a customer, item data identifying a price of an item to be purchased by the customer and customer data identifying the customer, where the item data may be received by a transaction card from a price tag of the item and via a wireless communication with the price tag. The method may include receiving price data identifying prices associated with a plurality of items and other data identifying locations, availabilities, and terms associated with the plurality of items, and processing the item data, the price data, and the other data, with a machine learning model, to identify an optimal price for the item relative to multiple prices associated with the item, where the multiple prices may be included in the prices associated with the plurality of items. The method may include providing, to the client device associated with the customer, data identifying the optimal price and data identifying a merchant associated with the optimal price, and receiving transaction data identifying the item, the optimal price, and the merchant when the customer purchases the item from the merchant. The method may include performing one or more actions based on the transaction data.

According to some implementations, a device may include one or more memories, and one or more processors to receive, from a client device associated with a customer, item data identifying a price of an item to be purchased by the customer and customer data identifying the customer, where the item data may be received by a transaction card from a price tag of the item and via a wireless communication with the price tag. The one or more processors may receive price data identifying prices associated with a plurality of items and other data identifying locations, availabilities, and terms associated with the plurality of items, and may process the item data, the price data, and the other data, with a machine learning model, to identify an optimal price for the item relative to multiple prices associated with the item. The multiple prices may be included in the prices associated with the plurality of items. The machine learning model may be trained based on historical item data identifying the plurality of items, historical price data identifying historical prices associated with the plurality of items, and historical other data identifying historical locations, historical availabilities, and historical terms associated with the plurality of items. The one or more processors may cause an indicator associated with the transaction card to be triggered based on how the price of the item provided on the price tag compares to the optimal price.

According to some implementations, a non-transitory computer-readable medium may store one or more instructions that, when executed by one or more processors of a device, may cause the one or more processors to receive, from a client device associated with a customer, item data identifying a price of an item to be purchased by the customer and customer data identifying the customer, where the item data may be received by a transaction card from a price tag of the item and via a wireless communication with the price tag. The one or more may cause the one or more processors to receive price data identifying prices associated with a plurality of items and other data identifying locations, availabilities, and terms associated with the plurality of items. The one or more may cause the one or more processors to process the item data, the price data, and the other data, with a machine learning model, to identify a ranked list of multiple prices associated with the item, where the multiple prices may be included in the prices associated with the plurality of items. The one or more may cause the one or more processors to provide, to the client device associated with the customer, data identifying the ranked list of the multiple prices and data identifying merchants associated with the multiple prices, and receive transaction data identifying the item, a particular price from the ranked list of the multiple prices, and a particular merchant from the merchants associated with the multiple prices, when the customer purchases the item from the particular merchant. The one or more may cause the one or more processors to perform one or more actions based on the transaction data.

BRIEF DESCRIPTION OF THE DRAWINGS

FIGS. 1A-1F are diagrams of one or more example implementations described herein.

FIG. 7 is a flow chart of an example process for utilizing machine learning and a smart transaction card to automatically identify optimal prices for items during in-person shopping.

FIG. 8 is a flow chart of an example process for utilizing machine learning and a smart transaction card to automatically identify rebates and submit rebate requests.

DETAILED DESCRIPTION

Figure 1A:
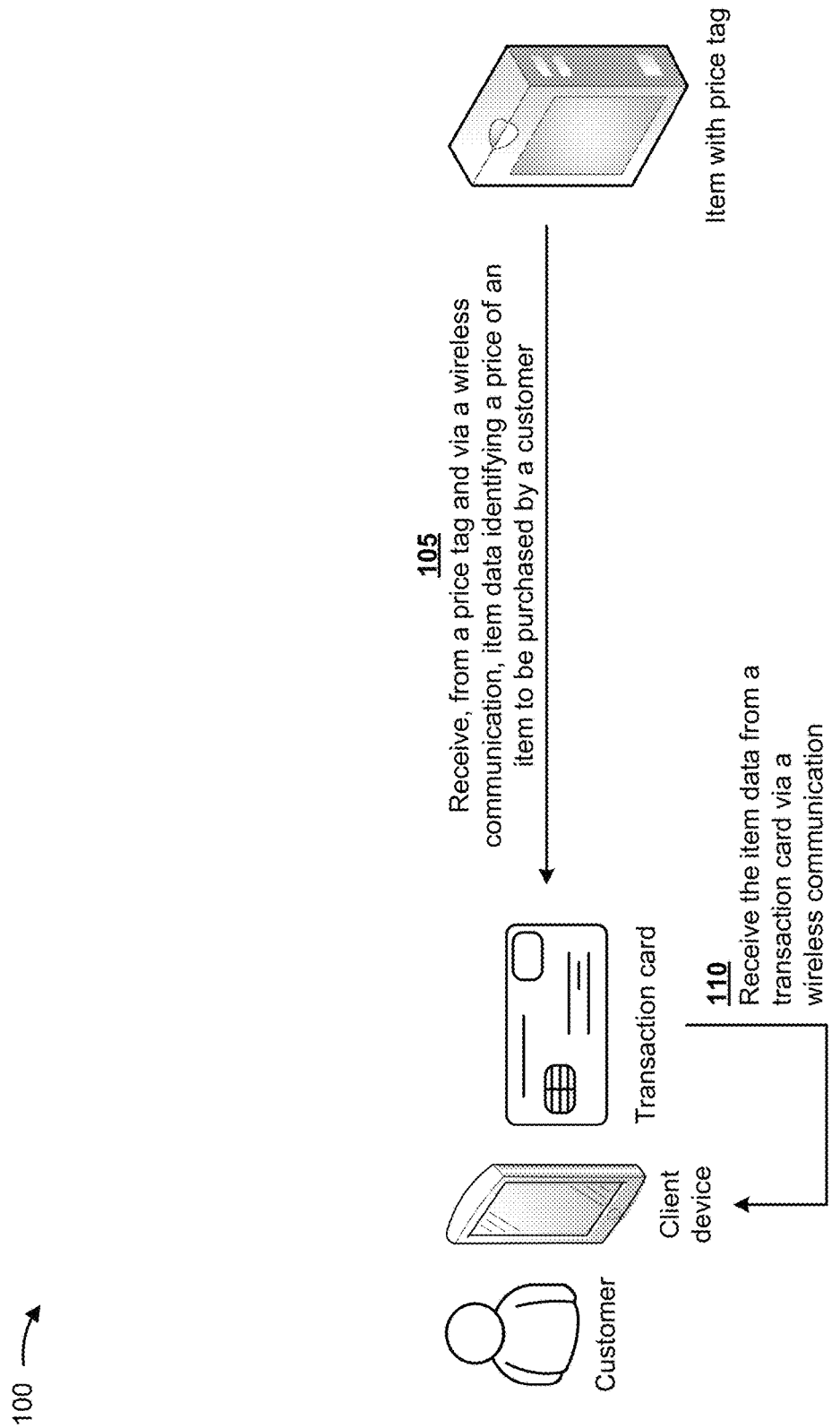

The following detailed description of example implementations refers to the accompanying drawings. The same reference numbers in different drawings may identify the same or similar elements.

When a customer shops at (e.g., in-person), the customer may compare prices of similar items offered by different manufacturers and sold by a merchant. However, it is very difficult and time consuming for the customer to determine whether a price of a particular item offered by the merchant is an optimal price compared to other merchants that sell the particular item. In order for the customer to compare prices of different merchants, the customer may travel to the different locations associated with the merchants to view prices for the particular item, may attempt to search online for prices offered by the different merchants, and/or the like. Thus, current in-person comparison shopping techniques may waste computing resources (e.g., processing resources, memory resources, communication resources, and/or the like), networking resources, transportation resources, and/or the like associated with attempting to identify the best deals for purchased items, determining whether a particular price is better than other prices for a same item, downloading price requests, traveling to different merchant stores, and/or like.

Some implementations described herein provide a processing platform that utilizes machine learning and a transaction card to automatically identify optimal prices for items during in-person shopping. For example, the processing platform may receive, from a client device associated with a customer, item data identifying a price of an item to be purchased by the customer and customer data identifying the customer, where the item data may be received by a transaction card from a price tag of the item and via a wireless communication with the price tag. The processing platform may receive price data identifying prices associated with a plurality of items and other data identifying locations, availabilities, and terms associated with the plurality of items, and may process the item data, the price data, and the other data, with a machine learning model, to identify an optimal price for the item relative to multiple prices associated with the item, where the multiple prices may be included in the prices associated with the plurality of items. The processing platform may provide, to the client device associated with the customer, data identifying the optimal price and data identifying a merchant associated with the optimal price, and may receive transaction data identifying the item, the optimal price, and the merchant when the customer purchases the item from the merchant. The processing platform may perform one or more actions based on the transaction data.

In this way, the processing platform utilizes machine learning and a transaction card to automatically identify optimal prices for items during in-person shopping and in near-real time (e.g., while a customer is reviewing an item at a store of a merchant). For example, a customer may utilize the transaction card to wirelessly communicate with a price tag of an item and to receive item data. The transaction card may wirelessly communicate the item data to a mobile device of the customer, and the mobile device may provide the item data to the processing platform. The processing platform may identify an optimal price for the item (e.g., from multiple prices), and may provide, to the mobile device, data identifying the optimal price, a merchant offering the optimal price, a location of the merchant, and/or the like. This, in turn, conserves computing resources, networking resources, and/or the like that would otherwise be wasted in attempting to identify best deals for purchased items, determining whether a particular price is better than other prices for a same item, downloading price requests, traveling to different merchant stores, and/or like.

FIGS. 1A-1F are diagrams of one or more example implementations 100 described herein. As shown in FIG. 1A, a client device may be associated with a transaction card and a processing platform. The client device may include a mobile device, a computer, and/or the like associated with a customer. The transaction card may include a credit card, a debit card, a rewards card, a prepaid card, and/or the like associated with the customer. The processing platform may include a platform that utilizes machine learning and information from the transaction card to automatically identify optimal prices for items during in-person shopping, as described herein.

As further shown in FIG. 1A, and by reference number 105, the transaction card may receive, from an item with a price tag and via a wireless communication, item data identifying an item that a customer is considering whether to purchase from a merchant. The item data may include information such as a name of the item, a brand of the item, a price associated with the item, a description of the item, a manufacturer of the item, a color of the item, a material of the item, a size of the item, a package associated with the item, warranty terms associated with the item, an SKU (stock keeping unit) of the item, and/or the like. The transaction card may obtain the item data through various means of wireless communication. For example, if both the transaction card and the item with the price tag have an NFC (near-field communication) chip, the transaction card may obtain the item data when the transaction card is brought in proximity to the item with the price tag. The transaction card may, alternatively, obtain the item data from the price tag through other wireless methods, such as through Bluetooth® technology.

As shown in FIG. 1A, and by reference number 110, the client device may receive the item data from the transaction card via a wireless communication. The client device may use various means of wireless communication to communicate with the transaction card. For example, the client device may use Bluetooth® technology to obtain data from the transaction card. In some implementations, the means of wireless communication may be different than the means of wireless communication used between the item with the price tag and the transaction card.

Figure 1B:
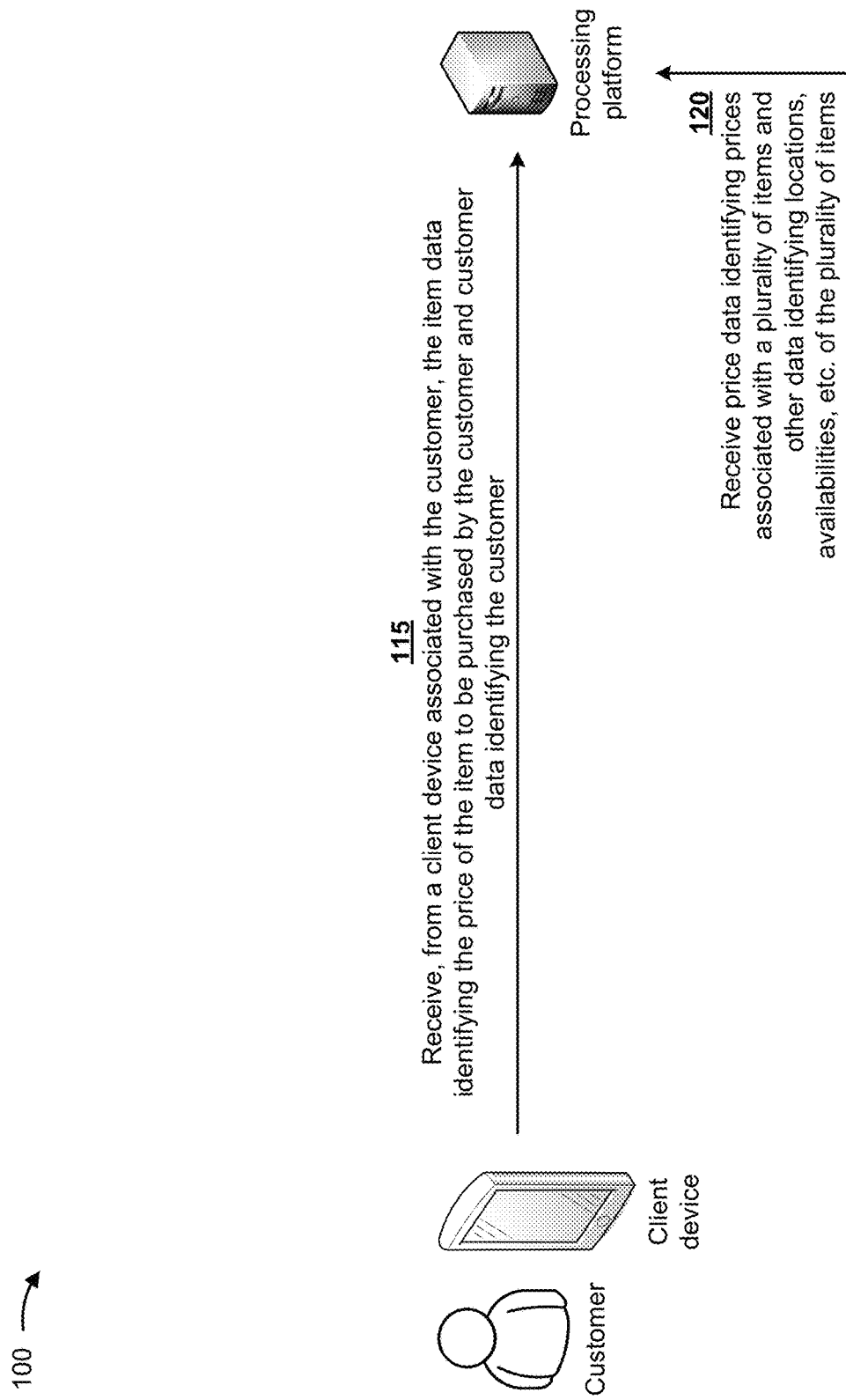

As shown in FIG. 1B, and by reference number 115, the processing platform may receive, from the client device associated with the customer, the item data identifying the item to be purchased by the customer and customer data identifying the customer. The customer data may include various information relating to the customer (e.g., a name of the customer, an address associated with the customer, and/or the like), information relating to the client device (e.g., a network address, a phone number, an identifier of an application on client device, information identifying a current location of the client device, and/or the like), and/or the like. In some implementations, the customer data may include various payment information associated with the customer, such as a method of payment, a card number, contact information in which to contact the customer (e.g., an address associated with the customer, an email address associated with the customer, and/or the like), and/or the like. Additionally, or alternatively, the customer data may include data identifying a rewards program associated with the customer, a loyalty program associated with the customer, and/or the like. In some implementations, the processing platform may obtain other customer data based on the customer data received from the client device. For example, the processing platform may receive a first set of customer data based on the customer interacting with an application on the client device, and may receive a second set of customer data based on the first set of customer data received from the client device. For example, the processing platform may use a name and address of the customer, received from the client device, to obtain transaction card rewards information for the customer from a data structure that stores rewards information for transaction cards.

In some implementations, there may be hundreds, thousands, and/or the like, of client devices that produce thousands, millions, billions, and/or the like, of data points indicating item data identifying items and/or customer data identifying customers. In this way, the processing platform may handle thousands, millions, billions, and/or the like, of data points within a period of time (e. g., daily, weekly, monthly), and thus may provide "big data" capability. In some implementations, the processing platform may store the item data identifying the item to be purchased by the customer and the customer data identifying the customer in a data structure (e.g., a database, a table, a list, and/or the like) associated with the processing platform.

As shown in FIG. 1B, and by reference number 120, the processing platform may receive price data identifying prices associated with a plurality of items and other data identifying locations, availabilities, and/or the like of the plurality of items. In some implementations, the processing platform may obtain the price data and/or other data by crawling the web, scraping the web, and/or the like. For example, the processing platform may scrape information from merchant websites on prices of currently available items at various locations associated with the merchant. Additionally, or alternatively, the processing platform may obtain the price data and/or other data information from a third-party source that obtains data from web sites, from merchants, and/or the like. The processing platform may store the price data and/or other data in a data structure to be accessible by the processing platform and/or other devices.

The price data may identify different prices associated with a plurality of items. For example, for a given item, the price data may include different prices from a plurality of merchants that are offering the given item. This may include information indicating a regular price of an item, a discounted price of an item, a time associated with a discounted price of an item (e.g., information identifying a time when the discount will no longer be available), and/or the like. In some implementations, the price data may indicate price fluctuations, variations, and/or the like over time associated with a particular merchant, a particular brand, and/or the like. In some implementations, the price data may identify pricing information associated with variants of items associated with an item (e.g., a different color of the item, a different version of the item, and/or the like). For example, for the price data may identify pricing information for a specific item (e.g., an item in which brand, quantity, color, and/or the like are specified) and/or for a generic item. In some implementations, the processing platform may process the price data to determine an average price of an item.

The other data may include various information relating to the plurality of items, other than price data. For example, the other data may include information indicating an availability of an item, of the plurality of items. In some implementations, the other data may include information including a location where an item may be obtained, information indicating available stock of the item, shipping times associated with the item, and/or the like. Additionally, or alternatively, the other data may include various information about the merchant associated with a particular price for an item. For example, the other data may include information indicating other items that the merchant is associated with, services that the merchant is associated with, a rewards program that the merchant offers, policies (e.g., price match policies) associated with the merchant, and/or the like.

Figure 1C:
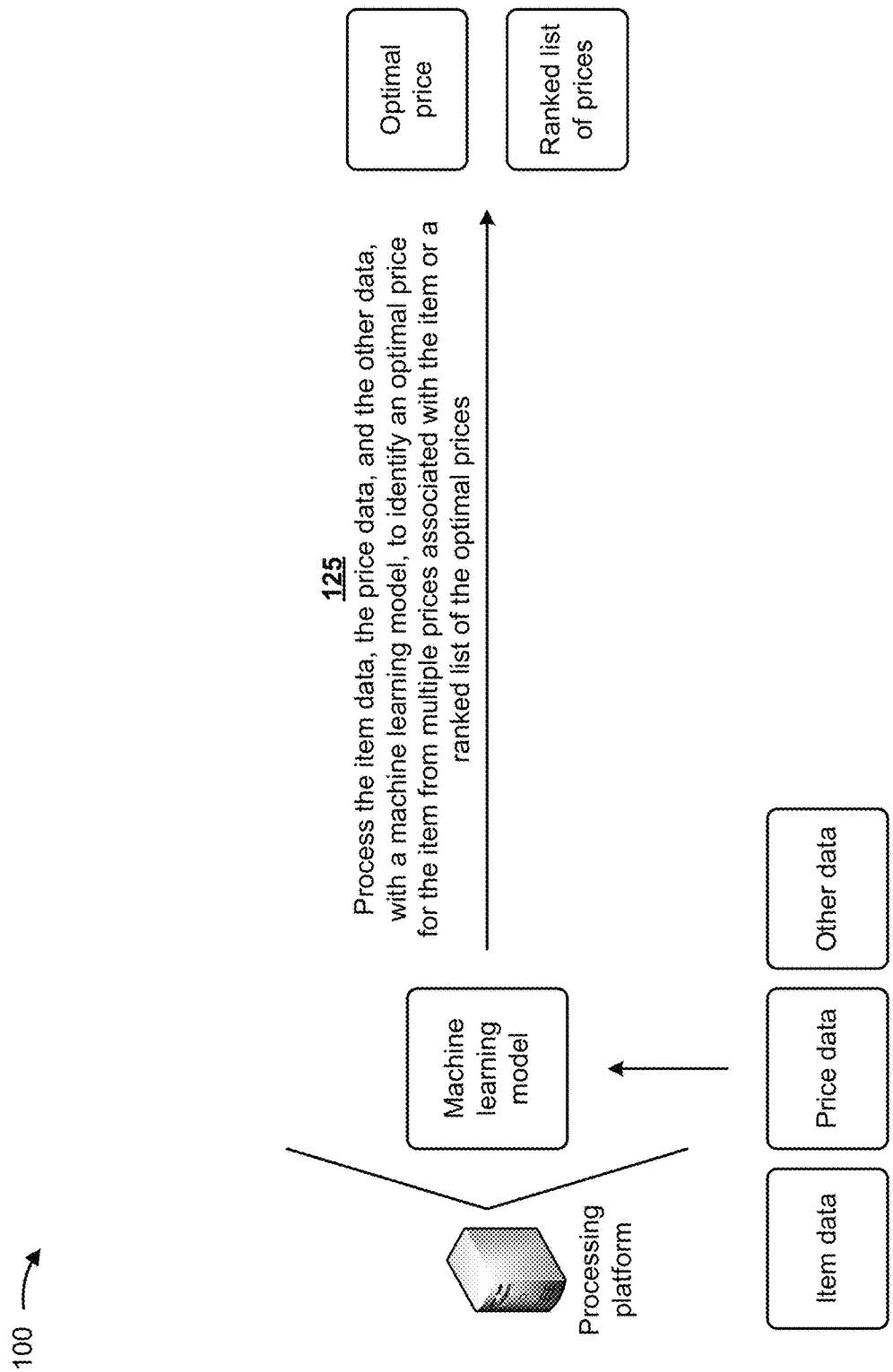

As shown in FIG. 1C, and by reference number 125, the processing platform may process the item data, the price data, and the other data, with a machine learning model, to identify an optimal price for the item from multiple prices associated with the item or a ranked list of the multiple prices. In this way, the processing platform may identify one or more merchants that offer optimal prices for an item, thereby saving computing resources associated with the customer having to navigate various resources to determine which merchant offers the optimal price for the item. The processing platform may identify characteristics in the item data, the price data, and the other data that result in optimal pricing for the customer. This may include other factors outside of a flat price that may be beneficial to the customer. For example, the processing platform may determine optimal price by analyzing a price of an item with a proximity of a merchant offering the item to the customer, other benefits associated with purchasing the item from a merchant (e.g., rewards points, and/or the like), a time associated with offering the item to the customer, and/or the like to determine other characteristics that are optimal to the customer. That is, the processing platform may identify additional costs associated with obtaining an item (e.g., extended time in obtaining an item, extended commuting costs in obtaining an item, and/or the like) to determine optimal prices for an item.

In some implementations, the processing platform may use the customer data in addition to the item data, the price data, and the other data to make this determination. For example, the processing platform may use the customer's location to identify tradeoffs in commute time that may affect the actual cost of obtaining an item. An item that is available at the customer's current location for a first, more expensive price (e.g., $105) may offer the customer a better price than an item that is available at another location for a second, less expensive price (e.g., $100) if the distance the customer has to travel to the other location will result in higher commute costs (e.g., >$5). If, in this same example, the processing platform determines that driving to the other location involves driving toward the customer's residence, the processing platform may determine, in this situation, that the other location has the optimal price. In some implementations, the customer data may help identify that an item is available at a merchant that offers the customer additional benefits (e.g., a better rewards rate, a bonus item, and/or the like). Thus, the processing platform may analyze many different pieces of data in determining the optimal price of an item.

In some implementations, the processing platform may train the machine learning model with historical data (e.g., historical transaction data, customer data, images of customers, names of customers, geographical locations of merchants, and/or the like) to generate a trained machine learning model. For example, the processing platform may train the machine learning model in a manner similar to the manner described below in connection with FIG. 3. In some implementations, rather than training the machine learning model, the processing platform may obtain the machine learning model from another system or device that trained the machine learning model. In this case, the processing platform may provide the other system or device with historical data for use in training the machine learning model, and may provide the other system or device with updated historical data to retrain the machine learning model in order to update the machine learning model. In some implementations, the processing platform may apply the machine learning model to a new observation in a manner similar to the manner described below in connection with FIG. 4.

Figure 1D:
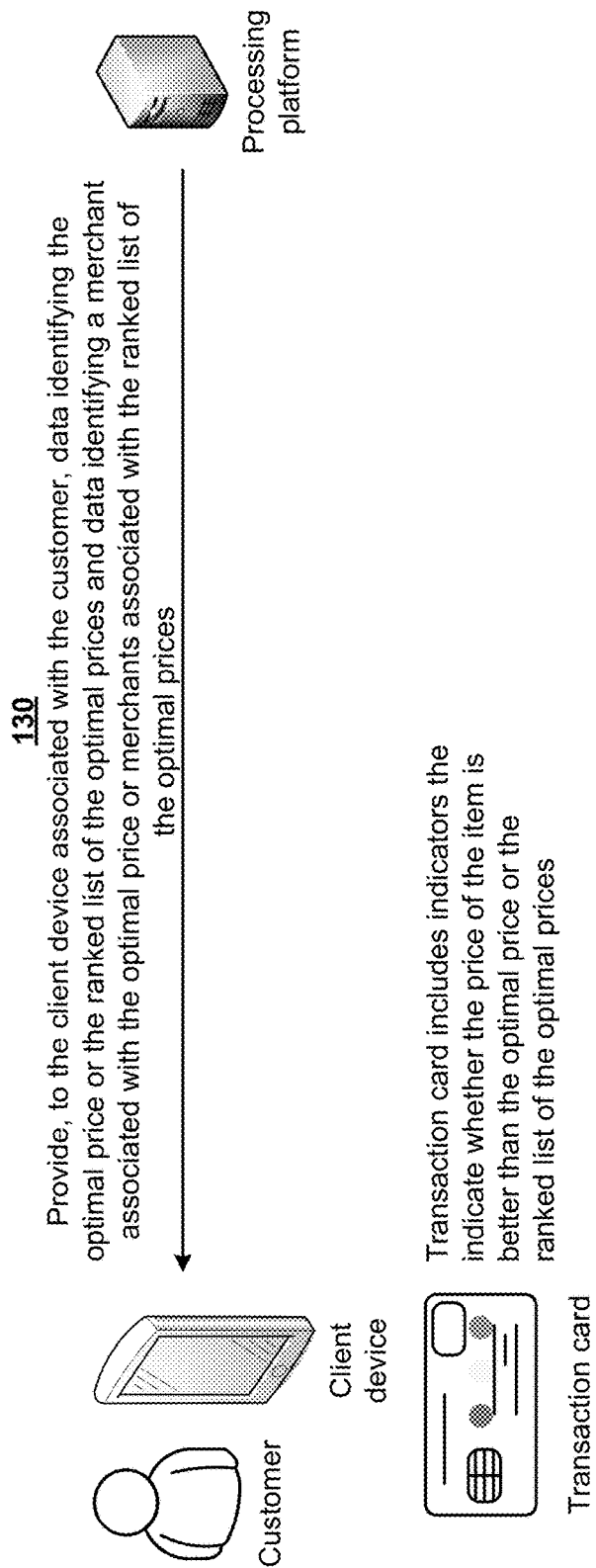

As shown in FIG. 1D, and by reference number 130, the processing platform may provide, to the client device associated with the customer, data identifying the optimal price or the ranked list of the optimal prices and data identifying a merchant associated with the optimal price or merchants associated with the ranked list of the optimal prices. The data identifying the optimal price or ranked list of the optimal prices may indicate various information about the price(s), such as an amount associated with the price(s), a ranking associated with the price(s), and/or the like. For example, the ranking may indicate that a particular optimal price is competitive among merchants, competitive based on time (e.g., the item is cheaper than the item has historically been), and/or the like. The customer may use the data identifying the optimal price to assist with determining whether to purchase the item, assist with determining where to purchase an item, assist with financial planning, and/or the like. In some implementations, the client device may provide information indicating that an optimal price(s) has been determined to the transaction card, which in turn may indicate to the customer that the optimal price is available (e.g., by activating a light on the transaction card, vibrating, and/or the like). In this way, the customer may be notified by the transaction card that the optimal price information is available to the customer such that the customer may be notified to check the transaction card and/or the client device for information on the optimal price(s). In some implementations, a color of the indicator may be triggered based on how the price of the item provided on the price tag compares to a lowest price of the optimal price(s) (e.g., red indicates a better price elsewhere, green indicates the current merchant is best, yellow indicates a potentially better price is available, and/or the like). In this way, the customer may receive, in near real-time, feedback, from the transaction card, as to whether the item of interest is associated with the optimal price.

The data identifying a merchant associated with the optimal price or merchants associated with the ranked list of the optimal prices may include a location of the merchant(s), a description of the merchant(s), rewards information associated with the merchant(s), and/or the like. In some implementations, the processing platform may provide navigation directions from a current location of the customer to a location of the merchants associated with the optimal prices (or to a location of the merchant with the optimal price), and provide data identifying the navigation directions to the client device associated with the customer. Additionally, or alternatively, the processing platform may provide, to a server device associated with a merchant associated with the price tag, a message indicating that the item is provided by the particular merchant associated with the particular price, and receive, from the server device, data identifying an offer that reduces the price of item displayed on the price tag to the particular price, and provide the data identifying the offer to the client device associated with the customer.

Figure 1E:
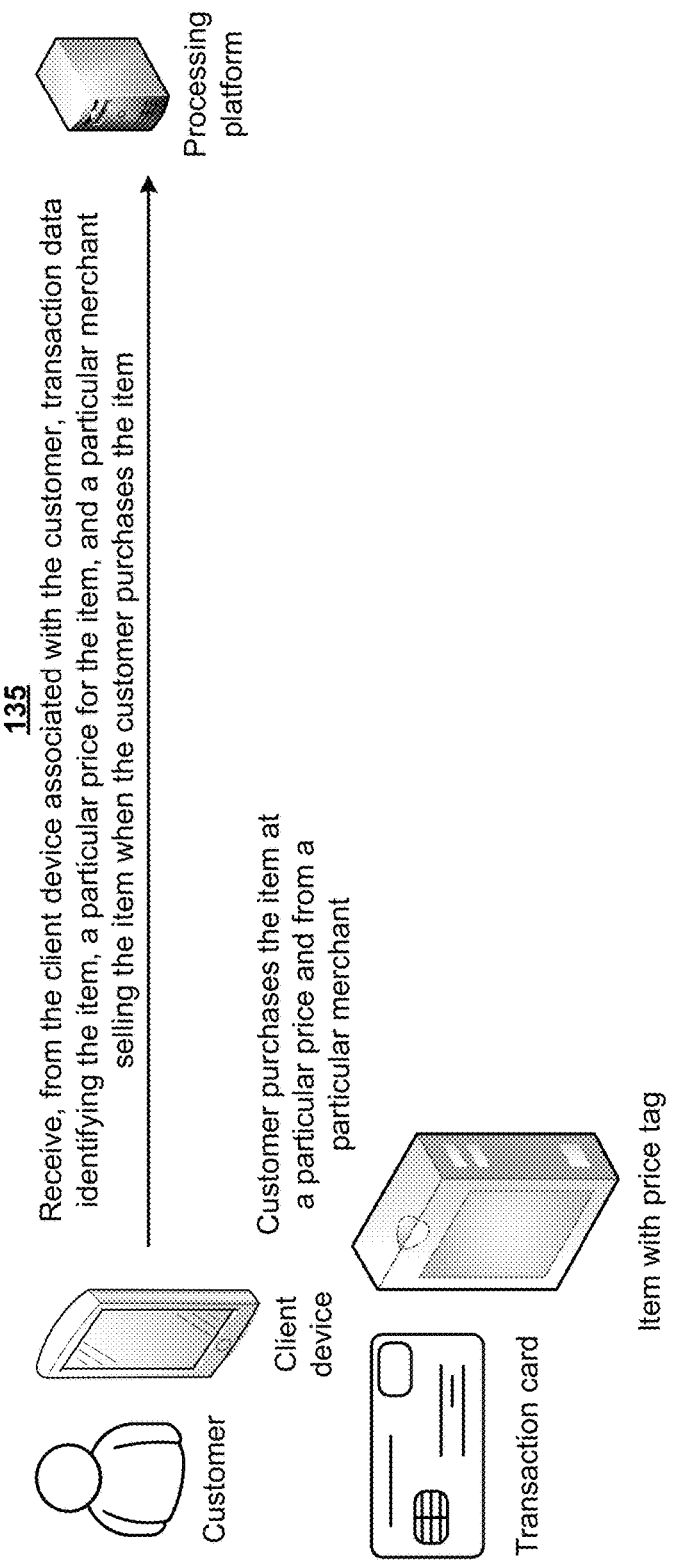

As shown in FIG. 1E, and by reference number 135, the processing platform may receive, from the client device associated with the customer, transaction data identifying the item, a particular price for the item, and a particular merchant selling the item when the customer purchases the item. In some implementations, the transaction data may indicate other information associated with the transaction. For example, the transaction data may indicate a date associated with the transaction, a time associated with the transaction, and/or the like. Based on obtaining the transaction data, the processing platform may determine that the customer has purchased the item from which the processing platform has determined an optimal price for. This may indicate that the customer has determined that the particular price and/or the particular merchant provides an optimal fit for the customer.

As shown in FIG. 1F, and by reference number 140, the processing platform may perform one or more actions based on the transaction data. In some implementations, the processing platform may perform automatic actions based on the transaction on behalf of the customer and/or the particular merchant. For example, the one or more actions may include the processing platform providing, to the client device of the customer, an offer associated with the item or the particular merchant. The processing platform may obtain information pertaining to offers associated with the particular merchant or the item to identify whether there are any offers available with the item or the particular merchant. The processing platform may obtain the information by scraping the particular merchant's website; generating a search query, submitting the search query to a search engine, and analyzing the results; and/or the like. Based on identifying an offer associated with the item or the particular merchant, the processing platform may notify the client device that there is an offer, automatically apply the offer to the transaction, and/or the like. By automatically providing the customer with the offer, the customer need not search for the offer, thereby saving computing resources, networking resources, and/or the like that would otherwise be wasted in attempting having to search for offers potentially related with the transaction.

In some implementations, the one or more actions may include the processing platform providing reward points for the transaction card. For example, the processing platform may contact a server device associated with the transaction card. The processing platform may send a request to the server device to update the reward points associated with the transaction card. The request may include information identifying the transaction card (e.g., the card number, information identifying an amount of reward points, and/or the like). In response to the request, the server device may identify the account associated with the transaction card and update the reward points associated with the transaction card based on the information identifying the amount of reward points in the request. The server device may notify the processing platform that this action has been completed, may notify the client device to the let the customer know that this action has been completed, and/or the like. By automatically providing the reward points for the transaction card and notifying the customer that the reward points have been applied to the transaction card, the processing platform conserves computing resources, networking resources, and/or the like that would otherwise be wasted by the customer having to contact the company that issued the transaction card to verify that the reward points have been applied.

In some implementations, the one or more actions may include the processing platform causing a server device associated with the particular merchant to provide a reward to the customer. The processing platform may send a request to the server device to provide a reward to the customer based on the customer determining to buy the item from the particular merchant. In some implementations, the customer may have obtained the item from the particular merchant at a higher price than that of the optimal price or one of the multiple prices in the ranked list based on determining that the particular merchant would provide a reward to the customer. The server device may update a customer account with the reward, determine the reward to give, and/or the like. The server device may notify the processing platform that this action has been completed, may notify the client device to let the customer that this action has been completed, and/or the like. By automatically sending the request to the server device to provide the reward to the customer and notifying the customer that the reward has been provided, the processing platform conserves computing resources, networking resources, and/or the like that would otherwise be wasted by the server device determining to provide the reward.

In some implementations, the one or more actions may include the processing platform determining whether the particular price is the optimal price or one of the multiple prices in the ranked list. The processing platform may obtain data about the particular price (e.g., amount of the particular price, merchant associated with the particular price, additional offers associated with the particular price, and/or the like) and compare the data about the particular price to the optimal price or to each of the optimal prices in the ranked list. Based on this comparison, the processing platform may determine whether particular price is the optimal price for the item. When the particular price is not the optimal price, the processing platform may store information relating to the transaction data. The stored transaction data may be used to improve the performance of the machine learning model. In this way, the processing platform may continually monitor performance and improve processes as needed to determine the optimal price for an item.

In some implementations, the one or more actions may include the processing platform receiving and analyzing feedback as to why the particular price was selected. For example, in those situations where the customer purchases an item at a non-optimal price, the processing platform may provide, to the client device of the customer, a request for feedback as to why the item at the particular price was purchased. The processing platform may receive feedback from the customer via the client device explaining why the item at the particular price was purchased. The processing platform may use the feedback to improve the performance of the machine learning model. In this way, the processing platform may continually monitor performance and improve processes as needed to determine the optimal price.

In some implementations, the one or more actions may include the processing platform retraining the machine learning model based on the particular action and/or feedback associated with performance of the particular action. The processing platform may input information relating to the particular action, transaction data relating to the purchase of the item, and/or information relating to feedback associated with performance of the particular action into the machine learning model and may retrain the machine learning model based on the input information. For example, the processing platform may retrain the machine learning model based on the transaction data and/or the customer feedback as to why the item was purchased at a non-optimal price. In this way, the processing platform may improve the accuracy of the machine learning model, which may improve speed and efficiency of the machine learning model and conserve computing resources, networking resources, and/or the like.

In this way, several different stages of the process for identifying optimal prices for items during in-person shopping are automated via machine learning and a transaction card, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning and a transaction card to automatically identify optimal prices for items during in-person shopping in the manner described herein. Finally, the process for utilizing machine learning and a transaction card to automatically identify optimal prices for items during in-person shopping conserves computing resources, networking resources, and/or the like that would otherwise be wasted in attempting to identify best deals for purchased items, determining whether a particular price is better than other prices for a same item, downloading price requests, traveling to different merchant stores, and/or like.

As indicated above, FIGS. 1A-1F are provided merely as examples. Other examples may differ from what is described with regard to FIGS. 1A-1F.

FIGS. 2A-2G are diagrams of one or more example implementations 200 described herein. Rebates may be offered by a merchant or a manufacturer of an item. Large merchants often work in conjunction with manufacturers regarding rebates, and may require two or more separate rebates for each item. Manufacturer rebates are sometimes valid only at a single merchant. A mail-in rebate entitles a customer to mail in a coupon, a receipt, a barcode, and/or the like in order to receive a check for a particular amount, depending on a product or a service purchased, a time associated with a purchase, a location of the purchase, and/or the like. However, it is difficult and time consuming for customers to discover rebates, fill out rebate requests (e.g., rebate forms) for discovered rebates, mail in the rebate requests, and/or the like, for items purchased by customers. Thus, current rebate techniques may waste computing resources (e.g., processing resources, memory resources, communication resources, and/or the like), networking resources, human resources, and/or the like associated with attempting to identify rebates for purchased items, determining whether an identified rebate is still valid, determining whether a particular rebate is better than other rebates for a same item, downloading rebate requests, entering information into rebate requests, and/or like.

Some implementations described herein provide a processing platform that utilizes machine learning and information from a smart transaction card to automatically identify rebates and submit rebate requests. For example, the processing platform may receive, from a client device associated with a customer, item data identifying an item to be purchased by the customer and customer data identifying the customer, where the item data may be received by a smart transaction card from a price tag of the item and via a wireless communication with the price tag. The processing platform may receive rebate data identifying rebates associated with a plurality of items, and may process the item data and the rebate data, with a machine learning model, to identify an optimal rebate for the item relative to multiple rebates associated with the item, where the multiple rebates may be included in the rebates associated with the plurality of items. The processing platform may provide, to the client device associated with the customer, data identifying the optimal rebate, and may receive, from the client device associated with the customer, transaction data identifying the item, a price for the item, and a merchant selling the item when the customer purchases the item. The processing platform may process, based on receiving the transaction data, a request for the optimal rebate, with the item data and the customer data, to generate a completed rebate for the item, and may perform one or more actions based on generating the completed rebate for the item.

In this way, the processing platform utilizes machine learning and information from a smart transaction card to automatically identify rebates and submit rebate requests in near-real time (e.g., while a customer is purchasing an item at a store of a merchant). For example, a customer may utilize the smart transaction card to wirelessly communicate with a price tag of an item and to receive item data. The smart transaction card may wirelessly communicate the item data to a client device of the customer, and the client device may provide the item data to the processing platform. The processing platform may identify an optimal rebate for the item (e.g., from multiple item rebates), and may automatically fill out and electronically submit a rebate request for the optimal rebate on behalf of the customer. This, in turn, conserves computing resources, networking resources, and/or the like that would otherwise be wasted in attempting to identify rebates for purchased items, determining whether the identified rebates are valid, determining whether a particular rebate is better than other rebates for a same item, downloading rebate requests, entering information into rebate requests, and/or like.

Figure 2A:
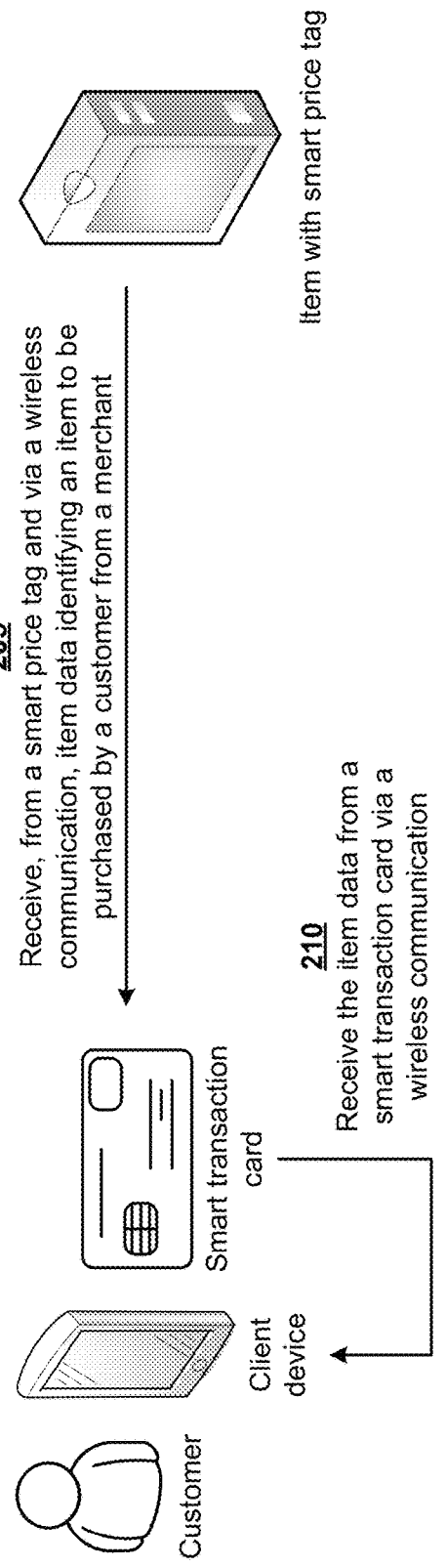
FIGS. 2A-2G are diagrams of one or more example implementations described herein.

As shown in FIG. 2A, a client device may be associated with a smart transaction card and a processing platform. The client device may include a mobile device, a computer, and/or the like associated with a customer. The smart transaction card may include a credit card, a debit card, a rewards card, a prepaid card, and/or the like that includes a communication interface that allows the smart transaction card to communicate with devices, such as a smart price tag, the client device, and/or the like. The processing platform may include a platform that utilizes machine learning and information from the smart transaction card to automatically identify rebates and submit rebate requests, as described herein.

As further shown in FIG. 2A, and by reference number 205, the smart transaction card may receive, from an item with a smart price tag and via a wireless communication, item data identifying an item to be purchased by a customer from a merchant. The item data may include information such as a name of the item, a brand of the item, a price associated with the item, a description of the item, a manufacturer of the item, a color of the item, a material of the item, a size of the item, a package associated with the item, warranty terms associated with the item, an SKU (stock keeping unit) of the item, and/or the like. The smart transaction card may obtain the item data through various means of wireless communication. For example, if both the smart transaction card and the item with the smart price tag have an NFC (near-field communication) chip, the smart transaction card may obtain the item data when brought in proximity to the item with the smart price tag. The smart transaction card may, alternatively, obtain the item data from the smart price tag through other wireless methods, such as through Bluetooth® technology.

As shown in FIG. 2A, and by reference number 210, the client device may receive the item data from the smart transaction card via a wireless communication. The client device may use various means of wireless communication to communicate with the smart transaction card. For example, the client device may use Bluetooth® technology to obtain data from the smart transaction card. In some implementations, the means of wireless communication may be different than the means of wireless communication used between the item with the smart price tag and the smart transaction card.

Figure 2B:
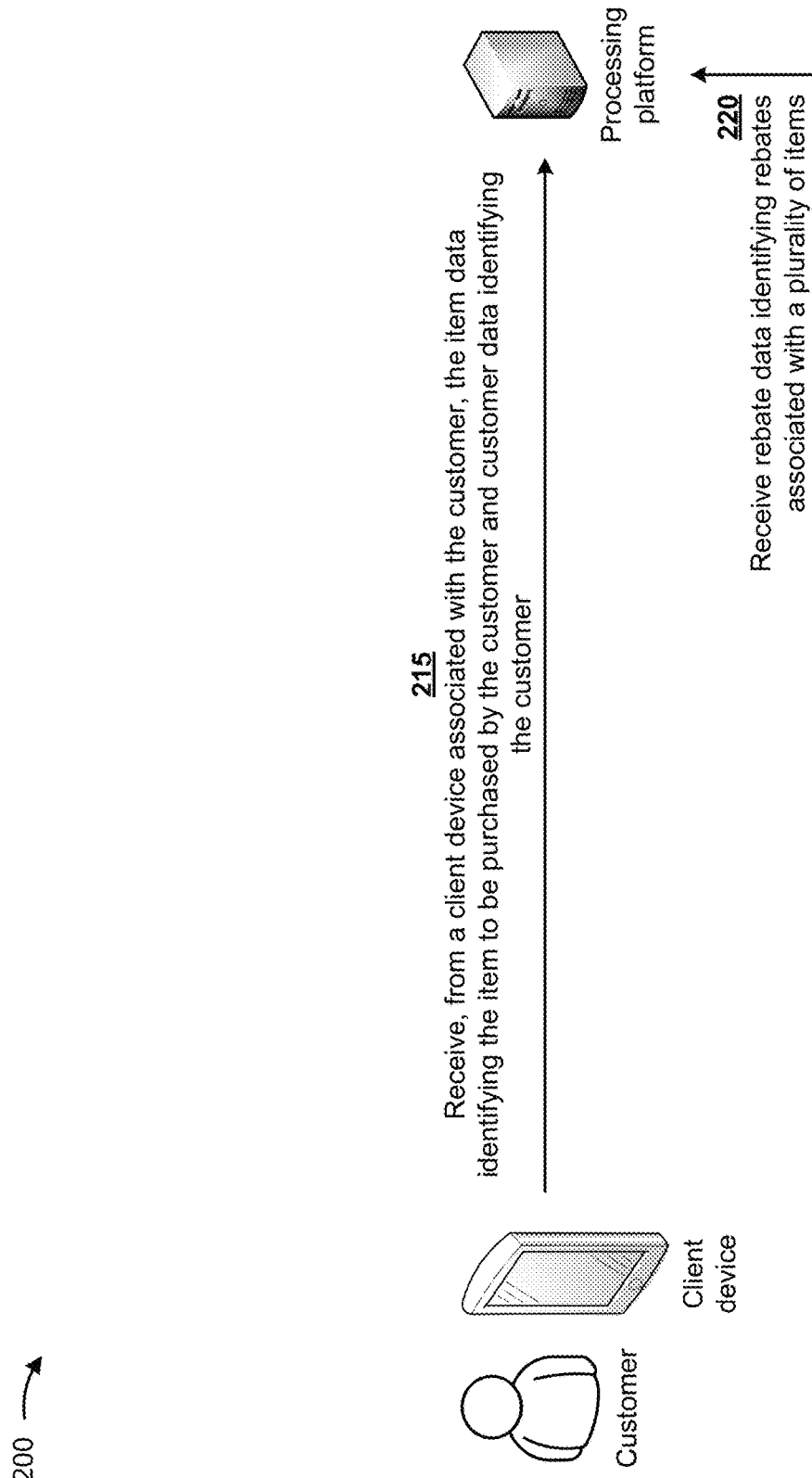

As shown in FIG. 2B, and by reference number 215, the processing platform may receive, from the client device associated with the customer, the item data identifying the item to be purchased by the customer and customer data identifying the customer. The customer data may include various information identifying the customer, such as a name of the customer, an address associated with the customer, a phone number associated with the customer, information relating to the client device (e.g., a network address, a phone number, an identifier of an application on client device, and/or the like), and/or the like. In some implementations, the customer data may include information that a customer typically supplies in completing a rebate form, such as a method of payment, contact information in which to contact the customer (e.g., an address associated with the customer, an email address associated with the customer, and/or the like), and/or the like. In some implementations, the processing platform may obtain the customer data for completing a rebate form from the customer data provided by the client device. For example, the client device may send, and the processing platform may receive, information identifying a network address of the client device. The processing platform may use the network address to obtain, from a data structure, the customer data for completing a rebate form.

In some implementations, there may be hundreds, thousands, and/or the like, of client devices that produce thousands, millions, billions, and/or the like, of data points indicating item data identifying items and/or customer data identifying customers. In this way, the processing platform may handle thousands, millions, billions, and/or the like, of data points within a period of time (e. g., daily, weekly, monthly), and thus may provide "big data" capability. In some implementations, the processing platform may store the item data identifying the item to be purchased by the customer and the customer data identifying the customer in a data structure (e.g., a database, a table, a list, and/or the like) associated with the processing platform.

As shown in FIG. 2B, and by reference number 220, the processing platform may receive rebate data identifying rebates associated with a plurality of items. The rebate data may identify various information about rebates, such as a party (e.g., a merchant, a manufacturer, and/or the like) associated with the rebate, a type of rebate offered, a value associated with the rebate, terms for qualifying for the rebate, and/or the like. In some implementations, the processing platform may obtain the rebate data identifying the rebates by crawling the Internet, obtaining data about rebates from a third party source, and/or the like. In some implementations, the processing platform may process the rebate data to identify multiple rebates associated with the item.

Figure 2C:
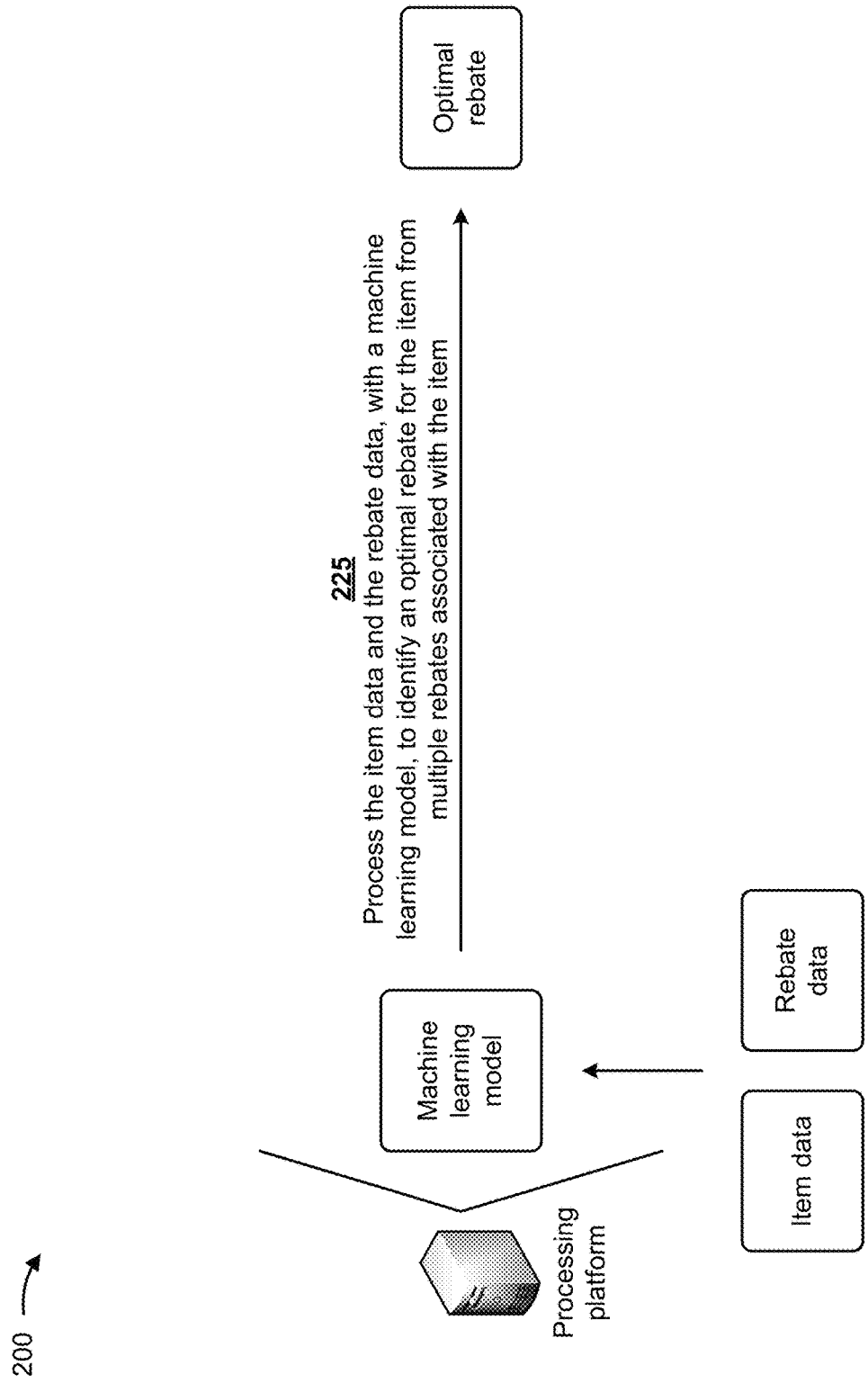

As shown in FIG. 2C, and by reference number 225, the processing platform may process the item data and the rebate data, with a machine learning model, to identify an optimal rebate for the item from multiple rebates associated with the item. The optimal rebate for the item may include a rebate provided by a merchant selling the item, a rebate provided by a manufacturer of the item, a rebate providing a percent reduction in a selling price of the item, a rebate providing money back to the customer, and/or the like. In some implementations, the optimal rebate may include two or more rebates associated with the item.

In some implementations, the processing platform may train the machine learning model with historical data (e.g., historical transaction data, customer data, images of customers, names of customers, geographical locations of merchants, and/or the like) to generate a trained machine learning model. For example, the processing platform may train the machine learning model in a manner similar to the manner described below in connection with FIG. 2. In some implementations, rather than training the machine learning model, the processing platform may obtain the machine learning model from another system or device that trained the machine learning model. In this case, the processing platform may provide the other system or device with historical data for use in training the machine learning model, and may provide the other system or device with updated historical data to retrain the machine learning model in order to update the machine learning model. For example, the processing platform may apply the machine learning model to a new observation in a manner similar to the manner described below in connection with FIG. 3.

Figure 2D:
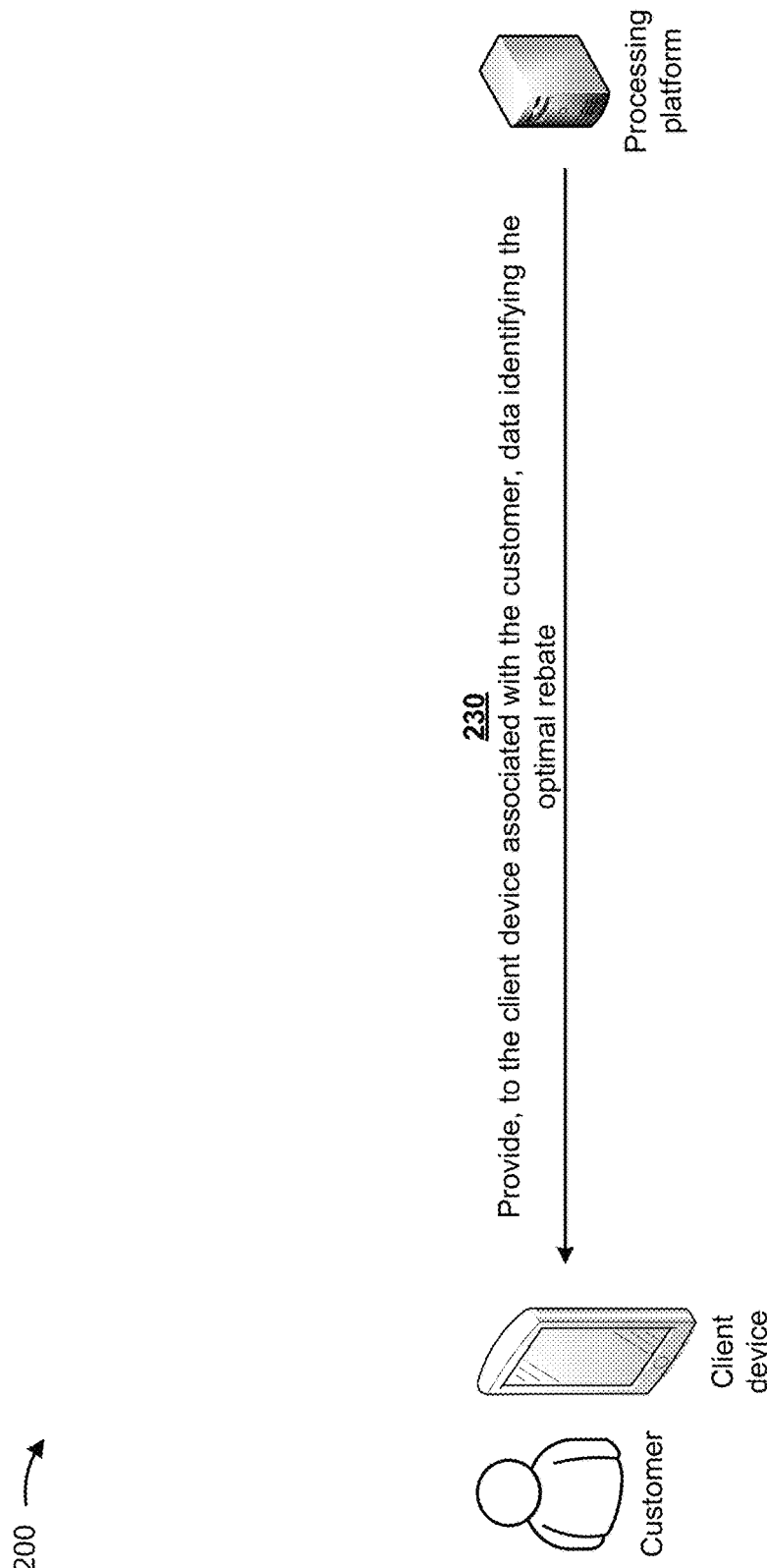

As shown in FIG. 2D, and by reference number 230, the processing platform may provide, to the client device associated with the customer, data identifying the optimal rebate. The data identifying the optimal rebate may indicate various information about the rebate, such as an amount associated with the rebate, a date associated with receiving the rebate, information on who is offering the rebate, and/or the like. The customer may use the data identifying the optimal rebate to assist with determining whether to purchase the item, assist with determining where to purchase an item, assist with financial planning, and/or the like. In some implementations, the client device may provide information indicating that a rebate exists to the smart transaction card, which could indicate that a rebate is available to the user (e.g., by activating a light on the transaction card, vibrating, and/or the like). In this way, the customer may be notified by the smart transaction card that a rebate is available to the customer such that the customer may be notified to check the transaction card for information on the rebate.

Figure 2E:
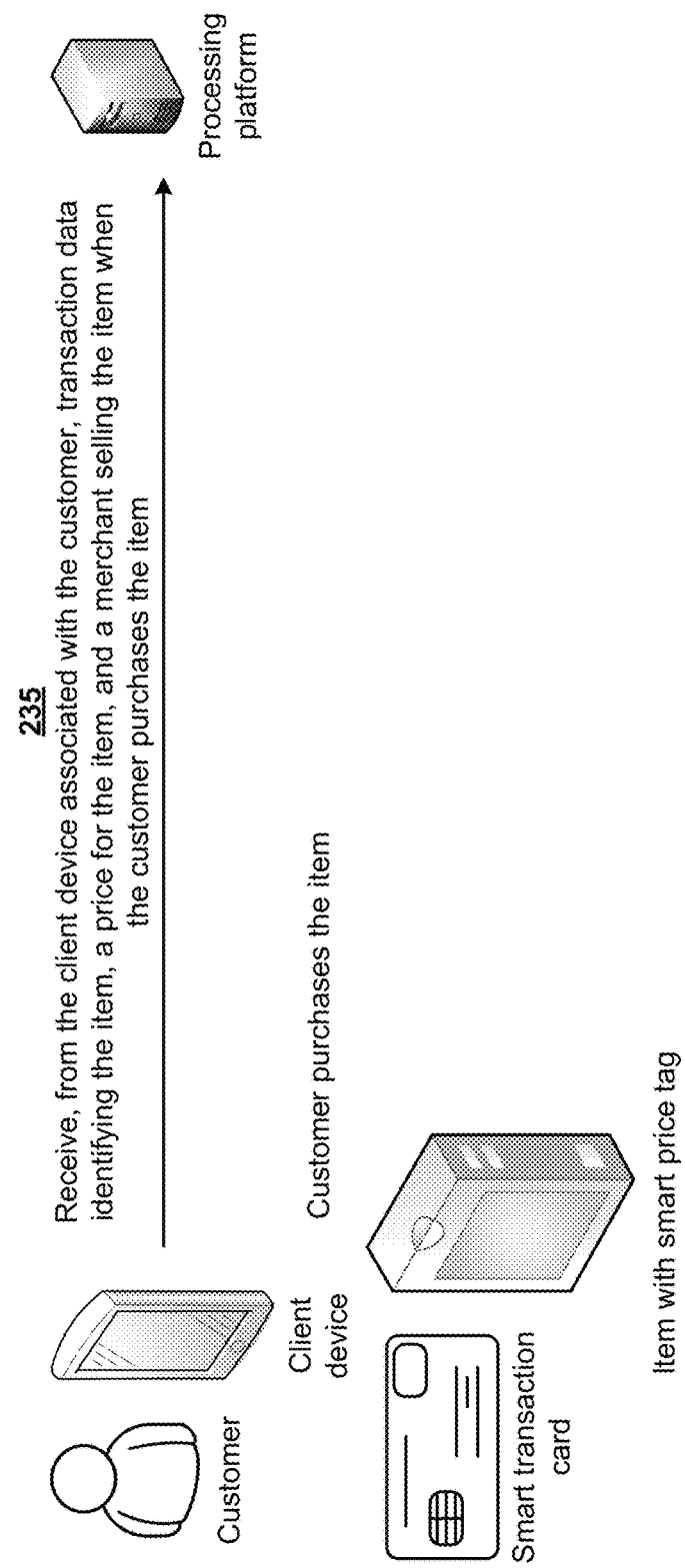

As shown in FIG. 2E, and by reference number 235, the processing platform may receive, from the client device associated with the customer, transaction data identifying the item, a price for the item, and a merchant selling the item when the customer purchases the item. In some implementations, the transaction data may indicate other information associated with the transaction. For example, the transaction data may indicate a date associated with the transaction, a time associated with the transaction, and/or the like. Based on obtaining the transaction data, the processing platform may determine that the customer has purchased the item from which the processing platform has determined an optimal rebate for and assist the customer in obtaining the optimal rebate for the item.

Figure 2F:
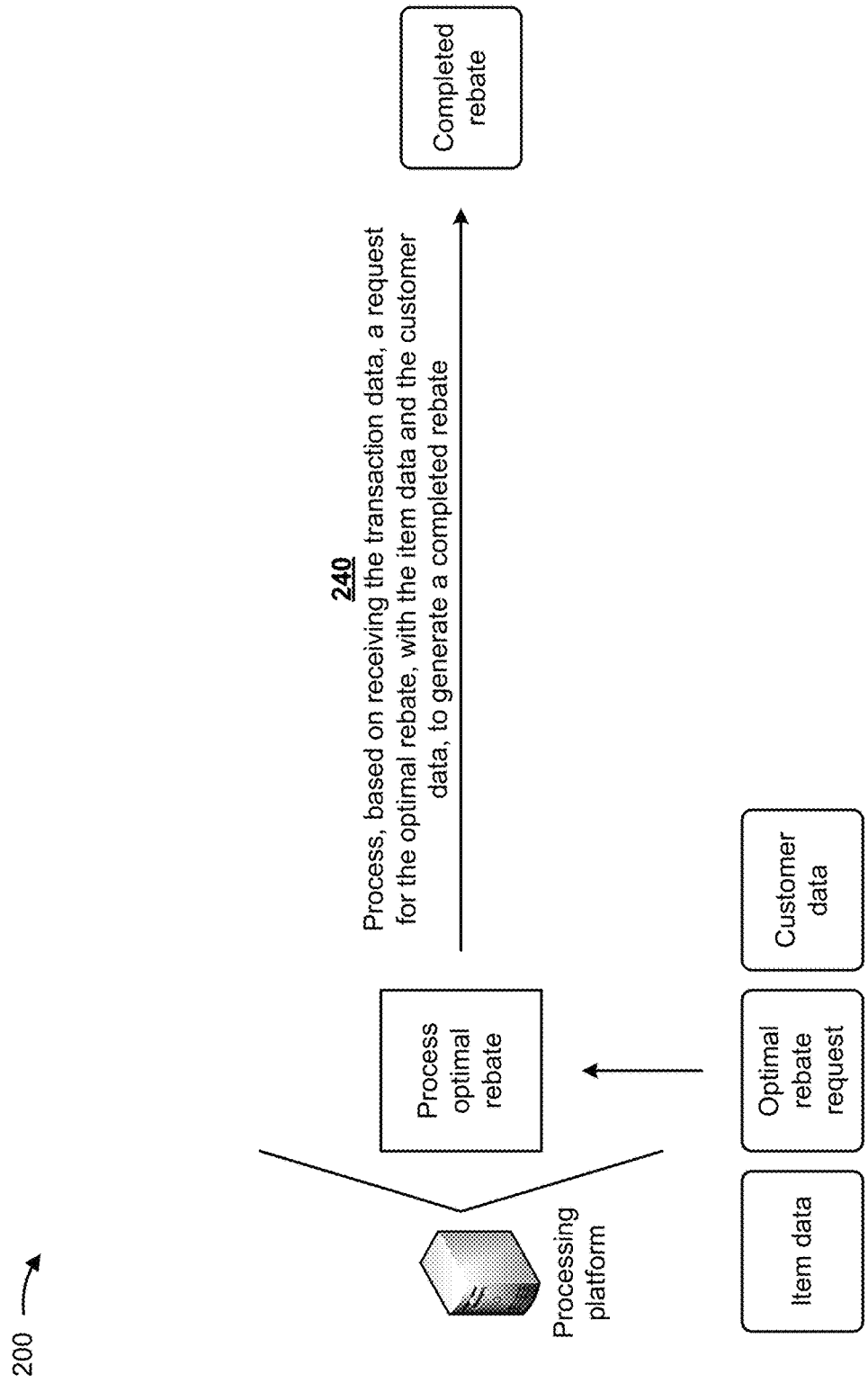

As shown in FIG. 2F, and by reference number 240, the processing platform may process, based on receiving the transaction data, a request for the optimal rebate, with the item data and the customer data, to generate a completed rebate. For example, the processing platform may fill out a rebate form associated with the optimal rebate by filling fields with the customer data (e.g., a name of the customer, an address of the customer, and/or the like), and/or the item data (e.g., a name of the item, a price associated with the item, and/or the like). In some implementations, the processing platform may process an electronic form to detect fields associated with the item and/or fields associated with the customer. Based on this, the processing platform may electronically populate the request with the item data in fields associated with the item, electronically populate the request with the customer data in other fields associated with the customer, and/or the like.

Figure 2G:
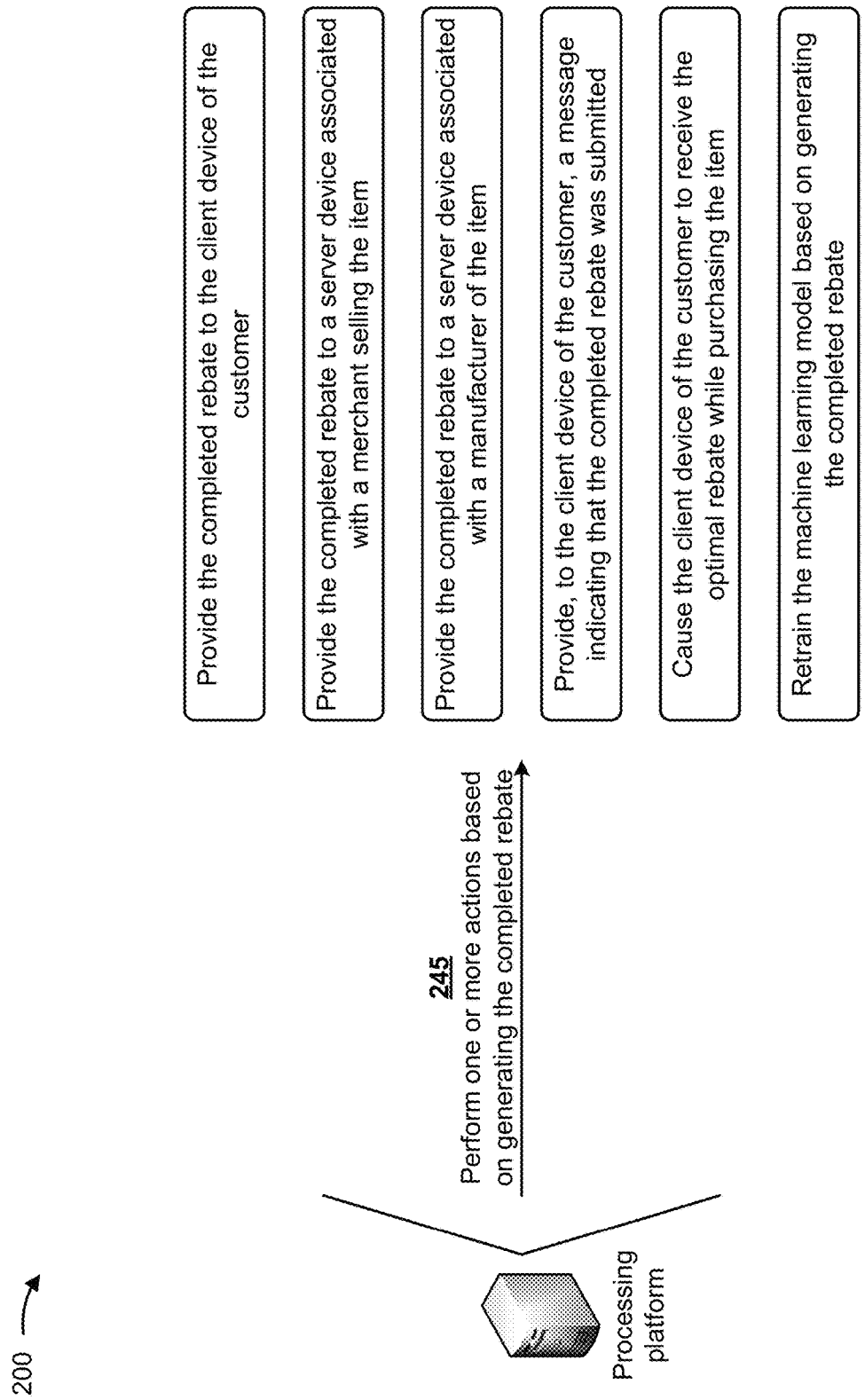

As shown in FIG. 2G, and by reference number 245, the processing platform may perform one or more actions based on generating the completed rebate. In some implementations, the processing platform may provide information to the customer. For example, the one or more actions may include providing the completed rebate to the client device of the customer, along with a link to a network location (e.g., a website) to which the completed rebate is to be submitted. The customer may, using the client device, submit the completed rebate to the appropriate destination. By providing the customer with the completed rebate and the link to the network location, the customer need complete the rebate or search for a location where the completed rebate is to be submitted, thereby saving computing resources, networking resources, and/or the like.

In some implementations, the one or more actions may include providing information to other devices based on generating the completed rebate. For example, the processing platform may provide the completed rebate to a server device associated with a merchant selling the item. Additionally, or alternatively, the processing platform may provide the completed rebate to a server device associated with the manufacturer of the item. Based on receiving the completed rebate, the server device associated with the merchant/manufacturer can process the rebate for the customer and provide, to the customer, the monetary amount associated with the rebate. For example, the server device may, based on receiving the completed rebate, cause a check to be issued and mailed to the customer. By completing and submitting the rebate to the appropriate destination on the customer's behalf, the processing platform conserves computing resources, networking resources, and/or the like that would otherwise be wasted in attempting to find an optimal rebate, completing the rebate, submitting the rebate to the appropriate destination.

In some implementations, the one or more actions may include obtaining information from a server device confirming that the completed rebate was submitted successfully. Based on this, the processing platform may interact with the client device to notify the customer that the completed rebate has been submitted successfully. In this way, the customer may receive notification that the rebate has been submitted successfully, thereby saving computing resources, networking resources, and/or the like that would otherwise be wasted in determining whether the completed rebate has been submitted successfully.

In some implementations, the one or more actions may include retraining the machine learning model based on the particular action and/or feedback associated with performance of the particular action. For example, the processing platform may input information relating to the particular action and/or information relating to feedback associated with performance of the particular action into the model and may retrain the model based on the input information. In this way, the processing platform may improve the accuracy of the machine learning model, which may improve speed and efficiency of the machine learning model and conserve computing resources, networking resources, and/or the like.

In this way, several different stages of the process for identifying rebates and submitting rebate requests are automated via machine learning and a smart transaction card, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning and a smart transaction card to automatically identify rebates and submit rebate requests in the manner described herein. Finally, the process for utilizing machine learning and a smart transaction card to automatically identify rebates and submit rebate requests conserves computing resources, networking resources, and/or the like that would otherwise be wasted in attempting to identify rebates for purchased items, determining whether a particular rebate is better than other rebates for a same item, downloading rebate requests, entering information into rebate requests, and/or like.

As indicated above, FIGS. 2A-2G are provided merely as examples. Other examples may differ from what is described with regard to FIGS. 2A-2G.

Figure 3:
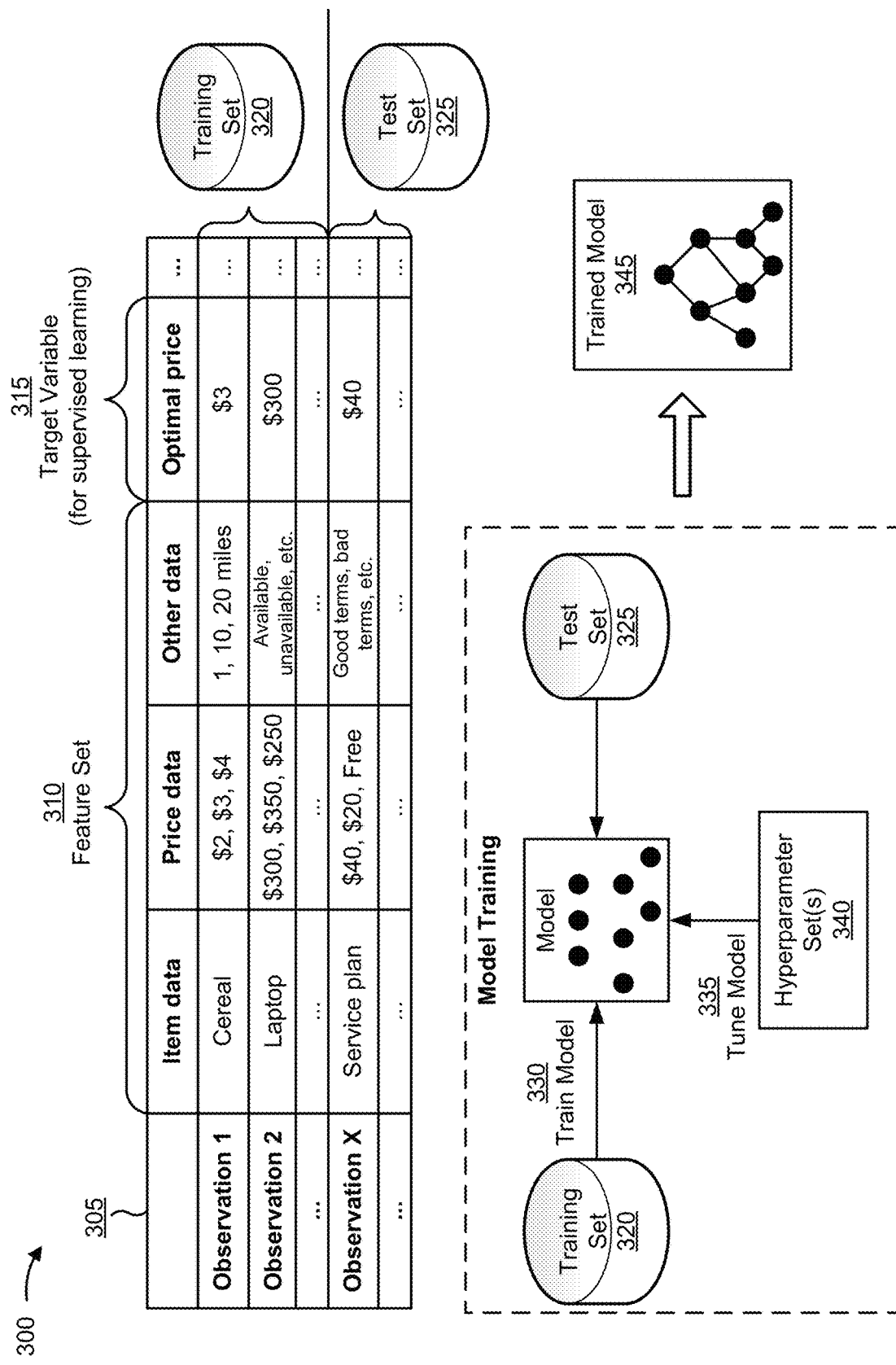
FIG. 3 is a diagram illustrating an example of training a machine learning model.

FIG. 3 is a diagram illustrating an example 300 of training a machine learning model. The machine learning model training described herein may be performed using a machine learning system. The machine learning system may include a computing device, a server, a cloud computing environment, and/or the like, such as the client device, the processing platform, and/or a device separate from the client device and the processing platform.

As shown by reference number 305, a machine learning model may be trained using a set of observations. The set of observations may be obtained and/or input from historical data, such as data gathered during one or more processes described herein. For example, the set of observations may include data gathered from user interaction with and/or user input to the processing platform, as described elsewhere herein. In some implementations, the machine learning system may receive the set of observations (e.g., as input) from the client device.

As shown by reference number 310, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the client device. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from the client device, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of item data, a second feature of price data, a third feature of other data, and so on. As shown, for a first observation, the first feature may include cereal, the second feature may have values of $2, $3, and $4, the third feature may include locations of 1, 10, and 20 miles, and so on. These features and feature values are provided as examples, and may differ in other examples. For example, the feature set may include one or more of the following features: item data (e.g., data identifying a price of an item to be purchased, a manufacturer of the item, a description of the item, a quantity of the item, and/or the like); merchant information (e.g., information identifying a name of merchant associated with the item, a location of the merchant, a store of the merchant where the item is located, and/or the like); price data (e.g., data identifying merchant prices, manufacturer prices, dollar values of prices, and/or the like); other data (e.g., distances to merchant locations selling the item, availabilities of the item at the different merchant locations, terms of sale of the item provided by the different merchants, and/or the like); and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 315, the set of observations may be associated with a target variable type (e.g., an optimal price). The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations (e.g., different words, phrases, sentences, and/or the like) may be associated with different target variable values.

The feature set and target variable described above are provided as examples, and other examples may differ from what is described above. For example, for a target variable of rebate (e.g., optimal rebate), the feature set may include item data (e.g., data identifying a price of an item to be purchased, a manufacturer of the item, a description of the item, a quantity of the item, and/or the like); merchant information (e.g., information identifying a name of merchant associated with the item, a location of the merchant, a store of the merchant where the item is located, and/or the like); rebate data (e.g., data identifying a merchant rebate, a manufacturer rebate, a percentage off a price, a dollar value, additional items to be received based on a purchase of the item, and/or the like); and/or the like.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that includes a first subset of observations, of the set of observations, and a test set 325 that includes a second subset of observations of the set of observations. The training set 320 may be used to train (e.g., fit, tune, and/or the like) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used, based on randomly generating hyperparameter values, and/or the like). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups, based on randomly selecting a number of groups, and/or the like) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, closest to a desired threshold, and/or the like) overall cross-validation score for training the machine learning model. The machine learning system may then train the machine learning model using the selected hyperparameter set 340, without cross-validation (e.g., using all data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 345 to be used to analyze new observations, as described below in connection with FIG. 4.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 345.

As indicated above, FIG. 3 is provided as an example. Other examples may differ from what is described in connection with FIG. 3. For example, the machine learning model may be trained using a different process than what is described in connection with FIG. 3. Additionally, or alternatively, the machine learning model may employ a different machine learning algorithm than what is described in connection with FIG. 3, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 4:
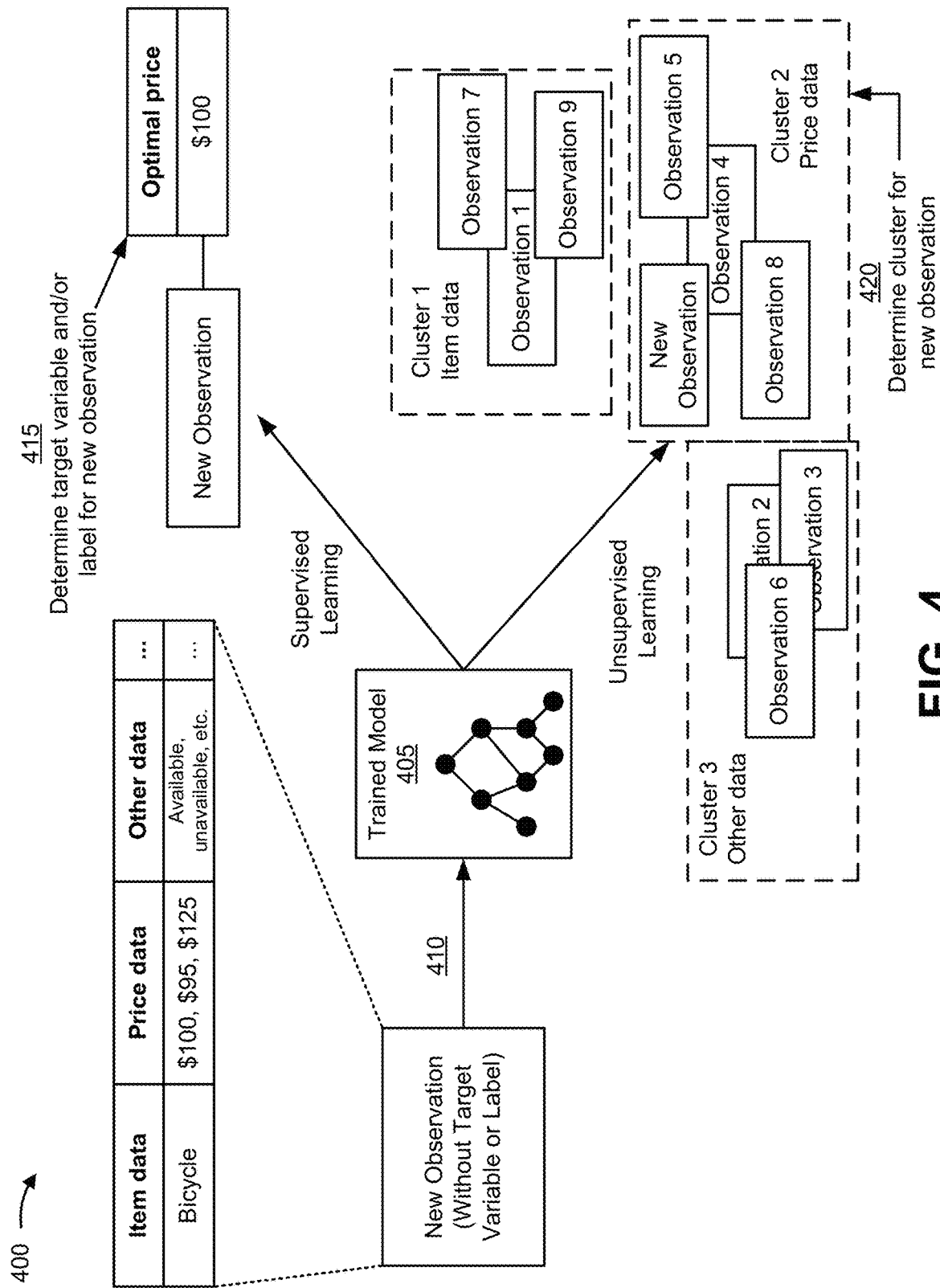
FIG. 4 is a diagram illustrating an example of applying a trained machine learning model to a new observation.

FIG. 4 is a diagram illustrating an example 400 of applying a trained machine learning model to a new observation. The new observation may be input to a machine learning system that stores a trained machine learning model 405. In some implementations, the trained machine learning model 405 may be the trained machine learning model 345 described above in connection with FIG. 3. The machine learning system may include a computing device, a server, a cloud computing environment, and/or the like, such as the processing platform.

As shown by reference number 410, the machine learning system may receive a new observation (or a set of new observations), and may input the new observation to the machine learning model 405. As shown, the new observation may include a first feature of item data (e.g., a bicycle), a second feature of price data (e.g., $100, $95, and $125), a third feature of other data (e.g., available at a merchant, unavailable at a merchant, and/or the like), and so on, as an example. The machine learning system may apply the trained machine learning model 405 to the new observation to generate an output (e.g., a result). The type of output may depend on the type of machine learning model and/or the type of machine learning task being performed. For example, the output may include a predicted (e.g., estimated) value of a target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 405 may predict "$100" for the target variable of optimal price, as shown by reference number 415. Based on this prediction (e.g., based on the value having a particular label/classification, based on the value satisfying or failing to satisfy a threshold, and/or the like), the machine learning system may provide a recommendation, such as the $100 price offered by a merchant is the optimal price for the bicycle. Additionally, or alternatively, the machine learning system may perform an automated action and/or may cause an automated action to be performed (e.g., by instructing another device to perform the automated action), such as purchasing the bicycle from the merchant offering the bicycle for $100. As another example, if the machine learning system were to predict a value of "$110" for the target variable of optimal price, then the machine learning system may provide a different recommendation (e.g., $110 is the optimal price offered by a merchant for the bicycle) and/or may perform or cause performance of a different automated action (e.g., purchase the bicycle from the merchant offering the bicycle for $110). In some implementations, the recommendation and/or the automated action may be based on the target variable value having a particular label (e.g., classification, categorization, and/or the like), may be based on whether the target variable value satisfies one or more thresholds (e.g., whether the target variable value is greater than a threshold, is less than a threshold, is equal to a threshold, falls within a range of threshold values, and/or the like), and/or the like.

In some implementations, the trained machine learning model 405 may classify (e.g., cluster) the new observation in an item data cluster, as shown by reference number 420. The observations within a cluster may have a threshold degree of similarity. Based on classifying the new observation in the item data cluster, the machine learning system may provide a recommendation, such as the optimal price may be used for the purchase of the bicycle. Additionally, or alternatively, the machine learning system may perform an automated action and/or may cause an automated action to be performed (e.g., by instructing another device to perform the automated action), such as purchasing the bicycle at the optimal price. As another example, if the machine learning system were to classify the new observation in a price data cluster, then the machine learning system may provide a different recommendation (e.g., a ranked list of prices offered by merchants for the bicycle) and/or may perform or cause performance of a different automated action (e.g., select one of the merchants from the ranked list of prices from which to purchase the bicycle). As still another example, if the machine learning system were to classify the new observation in other data cluster, then the machine learning system may provide a different recommendation (e.g., a different price should be selected for the bicycle since merchants offering the bicycle for less are located too far away) and/or may perform or cause performance of a different automated action (e.g., purchase the bicycle at the different price from a more convenient merchant).

The recommendations, actions, and clusters described above are provided as examples, and other examples may differ from what is described above. For example, the recommendations associated with determining a rebate (e.g., an optimal rebate) may include recommending a rebate to select and/or apply to a transaction. The actions associated with determining a rebate (e.g., an optimal rebate) may include, for example, utilizing and/or applying the rebate.

In this way, the machine learning system may apply a rigorous and automated process to automatically identify optimal prices for items during in-person shopping. The machine learning system enables recognition and/or identification of tens, hundreds, thousands, or millions of features and/or feature values for tens, hundreds, thousands, or millions of observations, thereby increasing an accuracy and consistency of automatically identifying optimal prices for items during in-person shopping relative to requiring computing resources to be allocated for tens, hundreds, or thousands of operators to manually identify optimal prices for items during in-person shopping.

As indicated above, FIG. 4 is provided as an example. Other examples may differ from what is described in connection with FIG. 4.

Figure 5:
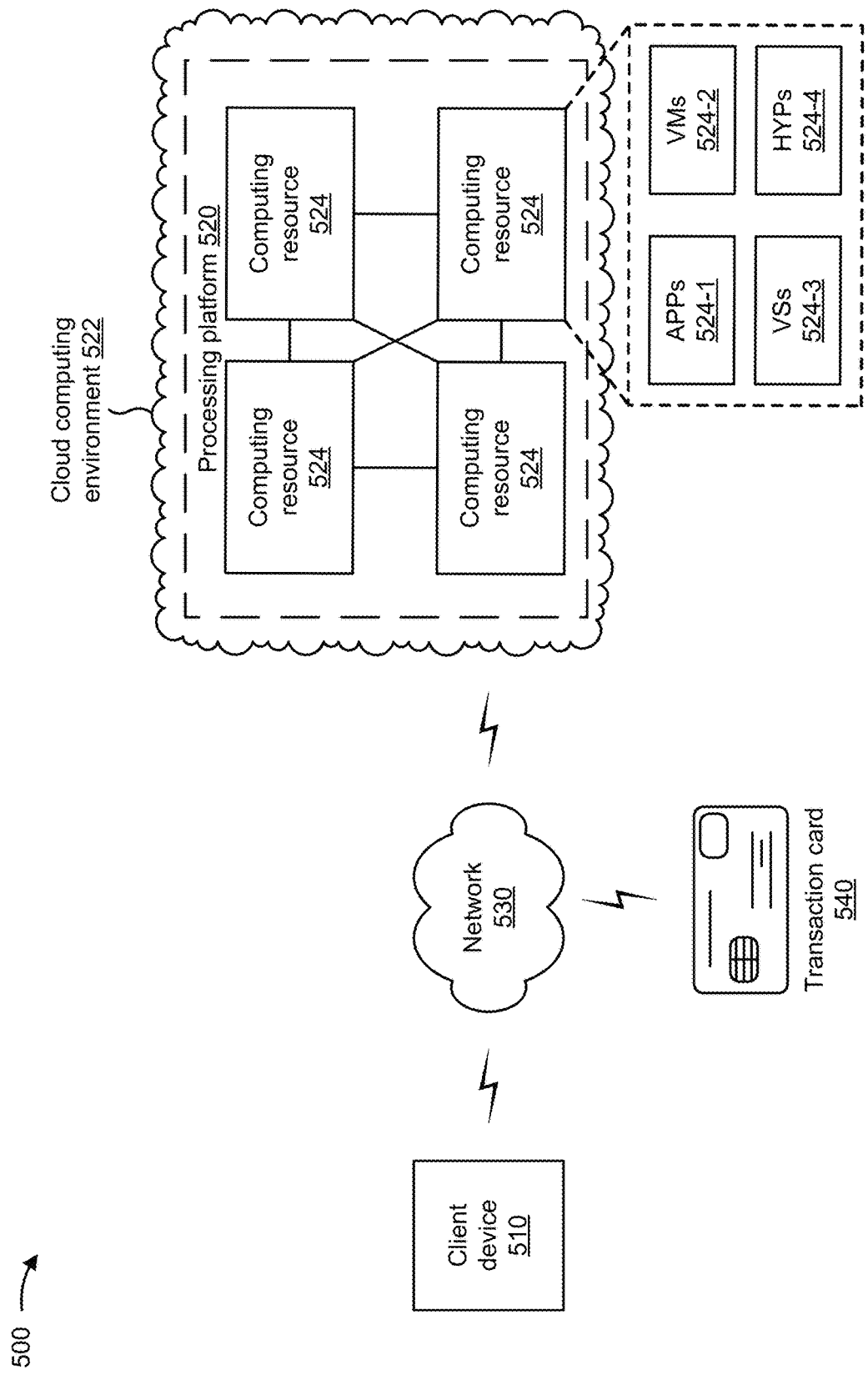
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a client device 510, a processing platform 520, a network 530, and a transaction card 540. Devices of environment 500 may interconnect via wired connections, wireless connections, or a combination of wired and wireless connections.

Client device 510 includes one or more devices capable of receiving, generating, storing, processing, and/or providing information, such as information described herein. For example, client device 510 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a point-of-sale (POS) device, or a similar type of device. In some implementations, client device 510 may receive information from and/or transmit information to processing platform 520.

Processing platform 520 includes one or more devices that utilize machine learning and a transaction card to automatically identify optimal prices for items during in-person shopping and/or to automatically identify rebates and submit rebate requests. In some implementations, processing platform 520 may be designed to be modular such that certain software components may be swapped in or out depending on a particular need. As such, processing platform 520 may be easily and/or quickly reconfigured for different uses. In some implementations, processing platform 520 may receive information from and/or transmit information to one or more client devices 510.

In some implementations, as shown, processing platform 520 may be hosted in a cloud computing environment 522. Notably, while implementations described herein describe processing platform 520 as being hosted in cloud computing environment 522, in some implementations, processing platform 520 may not be cloud-based (i.e., may be implemented outside of a cloud computing environment) or may be partially cloud-based.

Cloud computing environment 522 includes an environment that hosts processing platform 520. Cloud computing environment 522 may provide computation, software, data access, storage, etc., services that do not require end-user knowledge of a physical location and configuration of system(s) and/or device(s) that hosts processing platform 520. As shown, cloud computing environment 522 may include a group of computing resources 524 (referred to collectively as "computing resources 524" and individually as "computing resource 524").

Computing resource 524 includes one or more personal computers, workstation computers, mainframe devices, or other types of computation and/or communication devices. In some implementations, computing resource 524 may host processing platform 520. The cloud resources may include compute instances executing in computing resource 524, storage devices provided in computing resource 524, data transfer devices provided by computing resource 524, etc. In some implementations, computing resource 524 may communicate with other computing resources 524 via wired connections, wireless connections, or a combination of wired and wireless connections.

As further shown in FIG. 5, computing resource 524 includes a group of cloud resources, such as one or more applications ("APPs") 524-1, one or more virtual machines ("VMs") 524-2, virtualized storage ("VSs") 524-3, one or more hypervisors ("HYPs") 524-4, and/or the like.

Application 524-1 includes one or more software applications that may be provided to or accessed by client device 510. Application 524-1 may eliminate a need to install and execute the software applications on client device 510. For example, application 524-1 may include software associated with processing platform 520 and/or any other software capable of being provided via cloud computing environment 522. In some implementations, one application 524-1 may send/receive information to/from one or more other applications 524-1, via virtual machine 524-2.

Virtual machine 524-2 includes a software implementation of a machine (e.g., a computer) that executes programs like a physical machine. Virtual machine 524-2 may be either a system virtual machine or a process virtual machine, depending upon use and degree of correspondence to any real machine by virtual machine 524-2. A system virtual machine may provide a complete system platform that supports execution of a complete operating system ("OS"). A process virtual machine may execute a single program and may support a single process. In some implementations, virtual machine 524-2 may execute on behalf of a user (e.g., a user of client device 510 or an operator of processing platform 520), and may manage infrastructure of cloud computing environment 522, such as data management, synchronization, or long-duration data transfers.

Virtualized storage 524-3 includes one or more storage systems and/or one or more devices that use virtualization techniques within the storage systems or devices of computing resource 524. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 524-4 may provide hardware virtualization techniques that allow multiple operating systems (e.g., "guest operating systems") to execute concurrently on a host computer, such as computing resource 524. Hypervisor 524-4 may present a virtual operating platform to the guest operating systems and may manage the execution of the guest operating systems. Multiple instances of a variety of operating systems may share virtualized hardware resources.

Network 530 includes one or more wired and/or wireless networks. For example, network 530 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Transaction card 540 includes a transaction card that can be used to complete a transaction. For example, transaction card 540 may include a credit card, a debit card, a gift card, a payment card, an automated teller machine (ATM) card, a stored-value card, a fleet card, a room or building access card, a driver's license card, and/or the like. Transaction card 540 may be capable of storing and/or communicating data for a POS transaction with a transaction terminal. For example, transaction card 540 may store and/or communicate data, including account information (e.g., an account identifier, a cardholder identifier, etc.), expiration information of transaction card 540 (e.g., information identifying an expiration month and/or year of transaction card 540), banking information (e.g., a routing number of a bank, a bank identifier, etc.), transaction information (e.g., a payment token), and/or the like. For example, to store and/or communicate the data, transaction card 540 may include a magnetic strip and/or an integrated circuit (IC) chip.

In some implementations, transaction card 540 may include an antenna to communicate data associated with transaction card 540. The antenna may be a passive radio frequency (RF) antenna, an active RF antenna, a battery-assisted RF antenna, and/or the like. In some implementations, transaction card 540 may be a smart transaction card, capable of communicating wirelessly (e.g., via Bluetooth®, Bluetooth Low Energy (BLE), near-field communication (NFC), WiFi, and/or the like) with other devices, such as client device 510, processing platform 520, a digital wallet, an NFC attached to a price tag, and/or the like. In some implementations, transaction card 540 may communicate with client device 510 to complete a transaction (e.g., based on being moved within communicative proximity of client device 510).

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
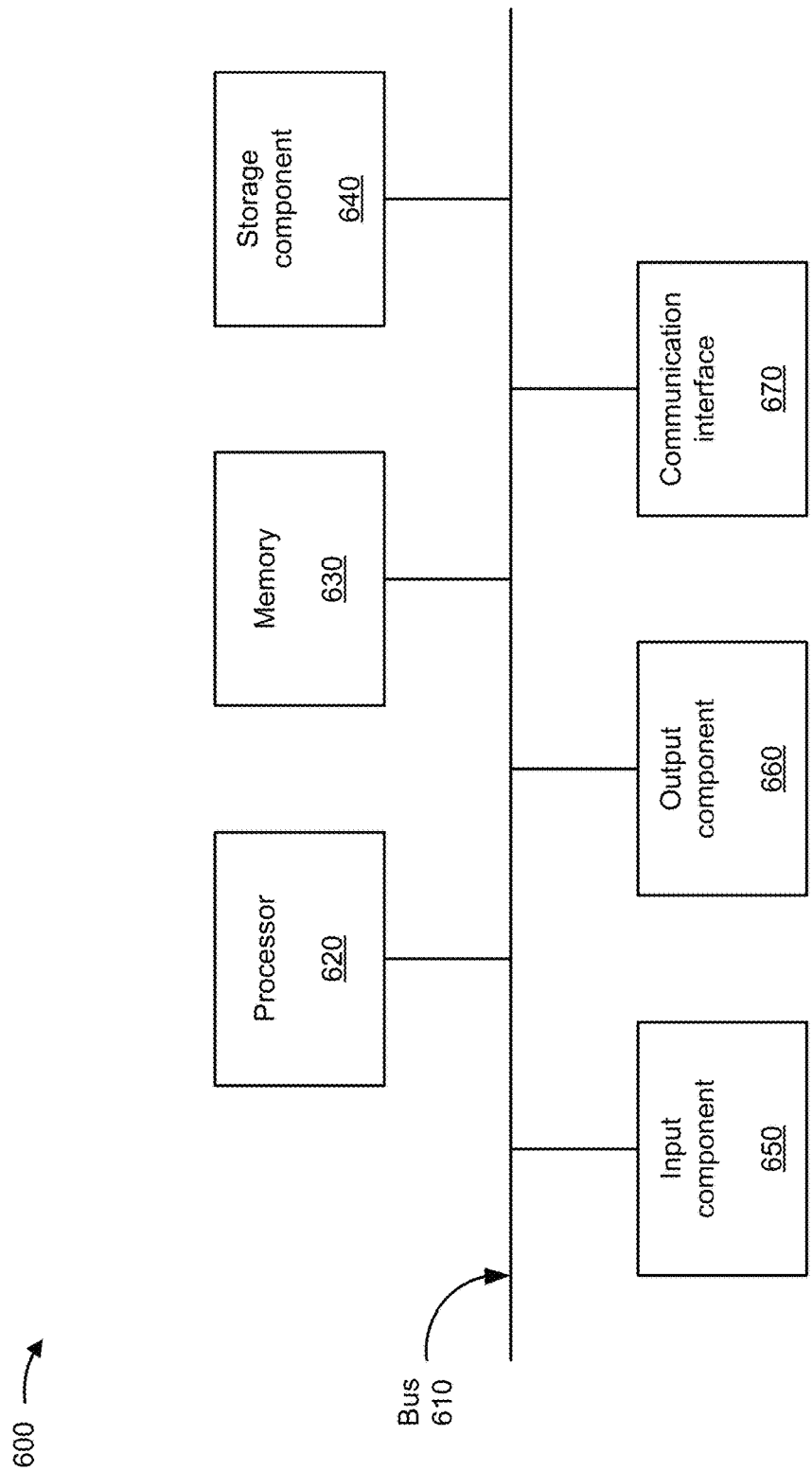
FIG. 6 is a diagram of example components of one or more devices of FIG. 5.

FIG. 6 is a diagram of example components of a device 600. Device 600 may correspond to client device 510, processing platform 520, computing resource 524, and/or transaction card 540. In some implementations, client device 510, processing platform 520, computing resource 524, and/or transaction card 540 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 is implemented in hardware, firmware, or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random-access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

FIG. 7 is a flow chart of an example process 700 for utilizing machine learning and a smart transaction card to automatically identify optimal prices for items during in-person shopping. In some implementations, one or more process blocks of FIG. 7 may be performed by a device (e.g., processing platform 520). In some implementations, one or more process blocks of FIG. 7 may be performed by another device or a group of devices separate from or including the device, such as a client device (e.g., client device 510).

As shown in FIG. 7, process 700 may include receiving, from a client device associated with a customer, item data identifying a price of an item to be purchased by the customer and customer data identifying the customer, wherein the item data is received by a transaction card from a price tag of the item and via a wireless communication with the price tag (block 710). For example, the device (e.g., using computing resource 524, processor 620, communication interface 670, and/or the like) may receive, from a client device associated with a customer, item data identifying a price of an item to be purchased by the customer and customer data identifying the customer, as described above. In some implementations, the item data may be received by a transaction card from a price tag of the item and via a wireless communication with the price tag.

As further shown in FIG. 7, process 700 may include receiving price data identifying prices associated with a plurality of items and other data identifying locations, availabilities, and terms associated with the plurality of items (block 720). For example, the device (e.g., using computing resource 524, processor 620, communication interface 670, and/or the like) may receive price data identifying prices associated with a plurality of items and other data identifying locations, availabilities, and terms associated with the plurality of items, as described above.

As further shown in FIG. 7, process 700 may include processing the item data, the price data, and the other data, with a machine learning model, to identify an optimal price for the item relative to multiple prices associated with the item, wherein the multiple prices are included in the prices associated with the plurality of items (block 730). For example, the device (e.g., using computing resource 524, processor 620, memory 630, and/or the like) may process the item data, the price data, and the other data, with a machine learning model, to identify an optimal price for the item relative to multiple prices associated with the item, as described above. In some implementations, the multiple prices may be included in the prices associated with the plurality of items.

As further shown in FIG. 7, process 700 may include providing, to the client device associated with the customer, data identifying the optimal price and data identifying a merchant associated with the optimal price (block 740). For example, the device (e.g., using computing resource 524, processor 620, communication interface 670, and/or the like) may provide, to the client device associated with the customer, data identifying the optimal price and data identifying a merchant associated with the optimal price, as described above.

As further shown in FIG. 7, process 700 may include receiving transaction data identifying the item, the optimal price, and the merchant when the customer purchases the item from the merchant (block 750). For example, the device (e.g., using computing resource 524, processor 620, communication interface 670, and/or the like) may receive transaction data identifying the item, the optimal price, and the merchant when the customer purchases the item from the merchant, as described above.

As further shown in FIG. 7, process 700 may include performing one or more actions based on the transaction data (block 760). For example, the device (e.g., using computing resource 524, processor 620, memory 630, storage component 640, communication interface 670, and/or the like) may perform one or more actions based on the transaction data, as described above.

Process 700 may include additional implementations, such as any single implementation or any combination of implementations described below and/or in connection with one or more other processes described elsewhere herein.

In a first implementation, the item data may be received based on another wireless communication between the transaction card and the client device.

In a second implementation, alone or in combination with the first implementation, receiving the price data identifying the prices associated with the plurality of items may include performing a crawl of a data source associated with the plurality of items, and receiving the price data identifying the prices associated with the plurality of items based on the performing the crawl of the data source.

In a third implementation, alone or in combination with one or more of the first and second implementations, performing the one or more actions may include determining whether the price of an item provided on the price tag is the optimal price; causing a server device associated with the merchant to provide a reward to the customer; or providing, to the client device of the customer, a request for feedback as to why the optimal price was selected.

In a fourth implementation, alone or in combination with one or more of the first through third implementations, performing the one or more actions may include providing reward points for the transaction card; providing, to the client device of the customer, an offer associated with the item or the merchant; or retraining the machine learning model based on the transaction data or customer feedback as to why the optimal price was selected.

In a fifth implementation, alone or in combination with one or more of the first through fourth implementations, process 700 may include causing an indicator associated with the transaction card to be triggered based on how the price of the item provided on the price tag compares to the optimal price.

In a sixth implementation, alone or in combination with one or more of the first through fifth implementations, process 700 may include receiving historical item data identifying the plurality of items; receiving historical price data identifying historical prices associated with the plurality of items; receiving historical other data identifying historical locations, historical availabilities, and historical terms associated with the plurality of items; and training the machine learning model based on the historical item data, the historical price data, the historical other data.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 for utilizing machine learning and a smart transaction card to automatically identify rebates and submit rebate requests. In some implementations, one or more process blocks of FIG. 8 may be performed by a device (e.g., processing platform 520). In some implementations, one or more process blocks of FIG. 8 may be performed by another device or a group of devices separate from or including the device, such as a client device (e.g., client device 510).

As shown in FIG. 8, process 800 may include receiving, from a client device associated with a customer, item data identifying an item to be purchased by the customer and customer data identifying the customer, wherein the item data is received by a transaction card from a price tag of the item and via a wireless communication with the price tag (block 810). For example, the device (e.g., using computing resource 524, processor 620, communication interface 670, and/or the like) may receive, from a client device associated with a customer, item data identifying an item to be purchased by the customer and customer data identifying the customer, as described above. In some implementations, the item data may be received by a transaction card from a price tag of the item and via a wireless communication with the price tag.

As further shown in FIG. 8, process 800 may include receiving rebate data identifying rebates associated with a plurality of items (block 820). For example, the device (e.g., using computing resource 524, processor 620, communication interface 670, and/or the like) may receive rebate data identifying rebates associated with a plurality of items, as described above.

As further shown in FIG. 8, process 800 may include processing the item data and the rebate data, with a machine learning model, to identify an optimal rebate for the item relative to multiple rebates associated with the item, wherein the multiple rebates are included in the rebates associated with the plurality of items (block 830). For example, the device (e.g., using computing resource 524, processor 620, communication interface 670, and/or the like) may process the item data and the rebate data, with a machine learning model, to identify an optimal rebate for the item relative to multiple rebates associated with the item, as described above. In some implementations, the multiple rebates may be included in the rebates associated with the plurality of items.

As further shown in FIG. 8, process 800 may include providing, to the client device associated with the customer, data identifying the optimal rebate (block 840). For example, the device (e.g., using computing resource 524, processor 620, communication interface 670, and/or the like) may provide, to the client device associated with the customer, data identifying the optimal rebate, as described above.

As further shown in FIG. 8, process 800 may include receiving, from the client device associated with the customer, transaction data identifying the item, a price for the item, and a merchant selling the item when the customer purchases the item (block 850). For example, the device (e.g., using computing resource 524, processor 620, communication interface 670, and/or the like) may receive, from the client device associated with the customer, transaction data identifying the item, a price for the item, and a merchant selling the item when the customer purchases the item, as described above.

As further shown in FIG. 8, process 800 may include processing, based on receiving the transaction data, a request for the optimal rebate, with the item data and the customer data, to generate a completed rebate for the item (block 860). For example, the device (e.g., using computing resource 524, processor 620, communication interface 670, and/or the like) may process, based on receiving the transaction data, a request for the optimal rebate, with the item data and the customer data, to generate a completed rebate for the item, as described above.

As further shown in FIG. 8, process 800 may include performing one or more actions based on generating the completed rebate for the item (block 870). For example, the device (e.g., using computing resource 524, processor 620, memory 630, storage component 640, communication interface 670, and/or the like) may perform one or more actions based on generating the completed rebate for the item, as described above.

Process 800 may include additional implementations, such as any single implementation or any combination of implementations described below and/or in connection with one or more other processes described elsewhere herein.

In a first implementation, the item data may be received based on another wireless communication between the transaction card and the client device.

In a second implementation, alone or in combination with the first implementation, receiving the rebate data identifying the rebates associated with the plurality of items may include performing a crawl of a data source associated with the plurality of items, and receiving the rebate data identifying the rebates associated with the plurality of items based on the performing the crawl of the data source.

In a third implementation, alone or in combination with one or more of the first and second implementations, performing the one or more actions may include providing the completed rebate to the client device of the customer; providing the completed rebate to a server device associated with a merchant selling the item; or providing the completed rebate to a server device associated with a manufacturer of the item.

In a fourth implementation, alone or in combination with one or more of the first through third implementations, performing the one or more actions may include providing, to the client device of the customer, a message indicating that the completed rebate was submitted; causing the client device of the customer to receive the optimal rebate while purchasing the item; or retraining the machine learning model based on generating the completed rebate.

In a fifth implementation, alone or in combination with one or more of the first through fourth implementations, performing the one or more actions may include providing the completed rebate to a server device associated with a merchant selling the item; receiving, from the server device, an indication that the completed rebate is approved; and providing the indication that completed rebate is approved to the client device associated with the customer.

In a sixth implementation, alone or in combination with one or more of the first through fifth implementations, the optimal rebate may include a rebate provided by a merchant selling the item, a rebate provided by a manufacturer of the item, a rebate providing a percent reduction in a selling price of the item, or a rebate providing money back to the customer.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device and from a client device associated with a customer, item data identifying a price of an item to be purchased by the customer and customer data identifying the customer,
  wherein the item data is received by a transaction card from a price tag of the item and via a wireless communication with the price tag;
receiving, by the device, price data identifying prices associated with a plurality of items and other data identifying locations, availabilities, and terms associated with the plurality of items;
processing, by the device, the item data, the price data, and the other data, with a machine learning model, to identify an optimal price for the item relative to multiple prices associated with the item at other locations,
  wherein the multiple prices are included in the prices associated with the plurality of items, and
  wherein processing the item data, the price data, and the other data to identify the optimal price is based on commute costs or time associated with the other locations,
    wherein the commute costs or time are determined based on commuting from a current location to another location, of the other locations, and to a future location associated with the customer or client device;
providing, by the device and to the client device associated with the customer, data identifying the optimal price and data identifying a merchant associated with the optimal price to cause the transaction card to provide a sensory notification,
  wherein providing the sensory notification includes providing a particular color of a particular indicator on the transaction card based on how the price of the item relates to the optimal price;
receiving, by the device, transaction data identifying the item, the optimal price, and the merchant when the customer purchases the item from the merchant; and performing, by the device, one or more actions based on the transaction data.

2. The method of claim 1, wherein the item data is received based on another wireless communication between the transaction card and the client device.

3. The method of claim 1, wherein receiving the price data comprises:
   performing a crawl of a data source associated with the plurality of items; and
   receiving the price data based on the performing the crawl of the data source.

4. The method of claim 1, wherein performing the one or more actions comprises one or more of:
   determining whether the price of an item provided on the price tag is the optimal price;
   causing a server device associated with the merchant to provide a reward to the customer; or
   providing, to the client device of the customer, a request for feedback as to why the optimal price was selected.

5. The method of claim 1, wherein performing the one or more actions comprises one or more of:
   providing reward points for the transaction card;
   providing, to the client device of the customer, an offer associated with the item or the merchant; or
   retraining the machine learning model based on the transaction data or customer feedback as to why the optimal price was selected.

6. The method of claim 1, further comprising:
   causing an indicator associated with the transaction card to be triggered based on how the price of the item provided on the price tag compares to the optimal price.

7. The method of claim 1, further comprising:
   receiving rebate data identifying rebates associated with a plurality of items;
   processing the item data and the rebate data, with another machine learning model, to identify an optimal rebate for the item relative to multiple rebates associated with the item,
      wherein the multiple rebates are included in the rebates associated with the plurality of items;
   providing, to the client device, data identifying the optimal rebate;
   receiving, from the client device, transaction data identifying the item, another price for the item, and a merchant selling the item when the customer purchases the item;
   processing, based on receiving the transaction data, a request for the optimal rebate, with the item data and the customer data, to generate a completed rebate for the item; and
   performing, by the device, one or more actions based on generating the completed rebate.

8. A non-transitory computer-readable medium storing instructions, the instructions comprising:
   one or more instructions that, when executed by one or more processors, cause the one or more processors to:
      receive, from a client device associated with a customer, item data identifying a price of an item to be purchased by the customer and customer data identifying the customer,
         wherein the item data is received by a transaction card from a price tag of the item and via a wireless communication with the price tag;
      receive price data identifying prices associated with a plurality of items and other data identifying locations, availabilities, and terms associated with the plurality of items;
      process the item data, the price data, and the other data, with a machine learning model, to identify a ranked list of multiple prices associated with the item,
         wherein the multiple prices are included in the prices associated with the plurality of items, and
         wherein the one or more instructions, that cause the one or more processors to process the item data, the price data, and the other data, cause the one or more processors to:
            process the item data, the price data, and the other data to identify the ranked list of the multiple prices based on commute costs or time associated with the other locations,
               wherein the commute costs or time are determined based on commuting from a current location to another location, of the other locations, and to a future location associated with the customer or client device;
      provide, to the client device associated with the customer, data identifying the ranked list of the multiple prices and data identifying merchants associated with the multiple prices to cause the transaction card to provide a sensory notification,
         wherein providing the sensory notification includes providing a particular color of a particular indicator on the transaction card based on how the price of the item relates to the multiple prices;
      receive transaction data identifying the item, a particular price from the ranked list of the multiple prices, and a particular merchant from the merchants associated with the multiple prices, when the customer purchases the item from the particular merchant; and
      perform one or more actions based on the transaction data.

9. The non-transitory computer-readable medium of claim 8, wherein the one or more instructions, that cause the one or more processors to receive the price data, cause the one or more processors to:
   perform a crawl of a data source associated with the plurality of items; and
   receive the price data based on the performing the crawl of the data source.

10. The non-transitory computer-readable medium of claim 8, wherein the one or more instructions, that cause the one or more processors to perform the one or more actions, cause the one or more processors to one or more of:
   determine whether the particular price is an optimal price relative to the multiple prices in the ranked list;
   cause a server device associated with the particular merchant to provide a reward to the customer;
   provide, to the client device of the customer, a request for feedback as to why the particular price was selected;
   provide reward points for the transaction card;
   provide, to the client device of the customer, an offer associated with the item or the particular merchant; or
   retrain the machine learning model based on the transaction data or customer feedback as to why the particular price was selected.

11. The non-transitory computer-readable medium of claim 8, wherein the one or more instructions, when executed by the one or more processors, further cause the one or more processors to:
   cause an indicator associated with the transaction card to be triggered based on how the price of the item provided on the price tag compares to a lowest price of the multiple prices.

12. The non-transitory computer-readable medium of claim 8, wherein the one or more instructions, that cause the one or more processors to perform the one or more actions, cause the one or more processors to:
  determine, prior to receiving the transaction data, navigation directions from a current location of the customer to locations of the merchants associated with the multiple prices; and
  provide data identifying the navigation directions to the client device associated with the customer.

13. The non-transitory computer-readable medium of claim 8, wherein the one or more instructions, that cause the one or more processors to perform the one or more actions, cause the one or more processors to:
  provide, to a server device associated with a merchant displaying the price tag and prior to receiving the transaction data, a message indicating that the item is provided by the particular merchant associated with the particular price;
  receive, from the server device, data identifying an offer that reduces the price of item displayed on the price tag to the particular price; and
  provide the data identifying the offer to the client device associated with the customer.

14. A device, comprising:
  one or more memories; and
  one or more processors, coupled to the one or more memories, configured to:
    receive, from a client device associated with a customer, item data identifying a price of an item to be purchased by the customer and customer data identifying the customer,
      wherein the item data is received by a transaction card from a price tag of the item and via a wireless communication with the price tag;
    receive price data identifying prices associated with a plurality of items and other data identifying locations, availabilities, and terms associated with the plurality of items;
    process the item data, the price data, and the other data, with a machine learning model, to identify a ranked list of multiple prices associated with the item,
      wherein the multiple prices are included in the prices associated with the plurality of items, and
      wherein the one or more processors, to process the item data, the price data, and the other data, cause the one or more processors to:
        process the item data, the price data, and the other data to identify the ranked list based on commute costs or time associated with the other locations,
          wherein the commute costs or time are determined based on commuting from a current location to another location, of the other locations, and to a future location associated with the customer or client device;
    provide, to the client device associated with the customer, data identifying the ranked list of the multiple prices and data identifying merchants associated with the multiple prices to cause the transaction card to provide a sensory notification,
      wherein providing the sensory notification includes providing a particular color of a particular indicator on the transaction card based on how the price of the item relates to the multiple prices;
    receive transaction data identifying the item, a particular price from the ranked list of the multiple prices, and a particular merchant from the merchants associated with the multiple prices, when the customer purchases the item from the particular merchant; and
    perform one or more actions based on the transaction data.

15. The device of claim 14, wherein the one or more processors, to receive the price data, are configured to:
  perform a crawl of a data source associated with the plurality of items; and
  receive the price data based on performing the crawl of the data source.

16. The device of claim 14, wherein the one or more processors, to perform the one or more actions, are configured to:
  determine whether the particular price is an optimal price relative to the multiple prices in the ranked list;
  cause a server device associated with the particular merchant to provide a reward to the customer;
  provide, to the client device of the customer, a request for feedback as to why the particular price was selected;
  provide reward points for the transaction card;
  provide, to the client device of the customer, an offer associated with the item or the particular merchant; or
  retrain the machine learning model based on the transaction data or customer feedback as to why the particular price was selected.

17. The device of claim 14, wherein the price tag identifies the price of the item; and
  wherein the one or more processors are further configured to:
    cause an indicator associated with the transaction card to be triggered based on how the price of the item provided on the price tag compares to a lowest price of the multiple prices.

18. The device of claim 14, wherein one or more processors, to perform the one or more actions, are configured to:
  determine, prior to receiving the transaction data, navigation directions from a current location of the customer to locations of the merchants associated with the multiple prices; and
  provide data identifying the navigation directions to the client device associated with the customer.

19. The device of claim 14, wherein one or more processors, to perform the one or more actions, are configured to:
  provide, to a server device associated with a merchant displaying the price tag and prior to receiving the transaction data, a message indicating that the item is provided by the particular merchant associated with the particular price;
  receive, from the server device, data identifying an offer that reduces the price of item displayed on the price tag to the particular price; and
  provide the data identifying the offer to the client device associated with the customer.

20. The device of claim 14, wherein the one or more processors are further configured to:
  receive rebate data identifying rebates associated with a plurality of items;
  process the item data and the rebate data, with another machine learning model, to identify an optimal rebate for the item relative to multiple rebates associated with the item,
    wherein the multiple rebates are included in the rebates associated with the plurality of items;
  provide, to the client device, data identifying the optimal rebate;

receive, from the client device, transaction data identifying the item, a price for the item, and a merchant selling the item when the customer purchases the item; and process, based on receiving the transaction data, a request for the optimal rebate, with the item data and the customer data, to generate a completed rebate for the item.

\* \* \* \* \*